United States Patent
Fung et al.

(10) Patent No.: US 9,634,744 B2
(45) Date of Patent: Apr. 25, 2017

(54) SPARSITY ENHANCED MISMATCH MODEL FOR HETEROGENEOUS NETWORKS WITH DOUBLY-SELECTIVE FADING CHANNELS

(71) Applicant: Taiwan Semiconductor Manufacturing Company, Ltd., Hsinchu (TW)

(72) Inventors: Carrson C. Fung, New Taipei (TW); Chieh-Yao Richard Chang, New Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 14/706,121

(22) Filed: May 7, 2015

(65) Prior Publication Data
US 2015/0326292 A1    Nov. 12, 2015

Related U.S. Application Data

(60) Provisional application No. 61/992,100, filed on May 12, 2014.

(51) Int. Cl.
*H04B 7/02* (2006.01)
*H04B 7/0426* (2017.01)
(Continued)

(52) U.S. Cl.
CPC ......... *H04B 7/0426* (2013.01); *H04B 7/0465* (2013.01); *H04L 5/0023* (2013.01); *H04W 72/0473* (2013.01)

(58) Field of Classification Search
CPC . H04B 7/0465; H04L 5/0023; H04W 72/0473
(Continued)

(56) References Cited

U.S. PATENT DOCUMENTS 9,077,599 B2 * 7/2015 Tomeba ............... H04B 7/0456
2004/0047426 A1 * 3/2004 Nissani
  Nissensohn ......... H04L 25/0242
  375/259

(Continued)

FOREIGN PATENT DOCUMENTS

WO    WO2013021803    *  2/2013

OTHER PUBLICATIONS

D. Tse and P. Viswanath, Fundamental of Wireless Communication, Cambridge University Press, 2005.
(Continued)

*Primary Examiner* — Leila Malek
(74) *Attorney, Agent, or Firm* — Haynes and Boone, LLP

(57) ABSTRACT

A deterministic mismatch model called Sparsity Enhanced Mismatch Model-Reverse discrete prolate spheroidal sequence which leads to a two stage transceiver design that outperforms precoding only strategy incorporating norm ball mismatch modeling. The inherent sparsity in the channel is brought forth by modeling the channel using a basis expansion model where discrete prolate spheroidal sequence is used as a basis. The sparsity enhanced mismatch model reverse discrete prolate spheroidal sequence disclosed herein better accounts for the channel state information estimate mismatch compared to the norm ball mismatch. The Sparsity Enhanced Mismatch Model-Reverse based transceiver system, which includes a two-stage precoder and decoder, allows the transceiver to utilize higher transmit power without violating the interference constraint placed at the victims, resulting in enhanced performance in the communication link.

23 Claims, 10 Drawing Sheets

(51) Int. Cl.
*H04B 7/04* (2017.01)
*H04W 72/04* (2009.01)
*H04L 5/00* (2006.01)

(58) Field of Classification Search
USPC .................................................. 375/267, 296
See application file for complete search history.

(56) References Cited

U.S. PATENT DOCUMENTS

| | | | | |
|---|---|---|---|---|
| 2012/0314678 | A1* | 12/2012 | Ko | H04L 5/0053 370/329 |
| 2014/0029509 | A1* | 1/2014 | Murakami | H04B 7/0413 370/315 |
| 2014/0185699 | A1* | 7/2014 | Zhang | H04B 7/024 375/267 |
| 2014/0219267 | A1* | 8/2014 | Eyuboglu | H04W 56/001 370/350 |

OTHER PUBLICATIONS

P.S. Rossi and R.R. Muller, "Slepian-based two-dimensional esitmation of time-frequency variant MIMO-OFDM channels," IEEE Signal Processing Letters, vol. 15, pp. 21-24, 2008.
W.U. Bajwa et al., "Compressed channel sensing: a new approach to estimating sparse multipath channels," Proceedings of the IEEE, vol. 98(6), pp. 1058-1076, Jun. 2010.
S. Boyd and L. Vandenberghe, Convex optimization, Cambridge University Press, 2004.
G. Zheng et al., "Robust beamforming in cognitive radio," IEEE Trans. on Wireless Communication, vol. 9(2), pp. 570-576, Feb. 2010.
E.A. Gharavol, Y.C. Liang, and K. Mouthaan, "Robust linear tranceiver design in MIMO ad hoc cognitive radio networks with imperfect channel state information," IEEE Trans. on Wirelss Commnication, vol. 10(5), pp. 1488-1457, May 2011.
M.H. Islam, Y.-C. Liang and R. Zhang, "Robust precoding for orthogonal space-time block coded MIMO cognitive radio networks," Proc. of the Workshop on Signal Processing Advances in Wireless Communications, pp. 86-90, Jun. 2009.
L. Zhang et al., "Robust cognitive beamforming with partial channel state information," IEE Trans. on Wireless Communication, vol. 8(8), pp. 4143-4153, Feb. 2009.
E.A. Gharavol, Y.-C. Liang, and K. Mouthaan, "Robust downlink beamforming in multiuser MISO cognitive radio networks with imperfect channel-state information," IEEE Trans. on Vehicular Technology, vol. 59(6), pp. 2852-2860, Jul. 2010.
G. Zheng, K.-K. Wong, and B. Ottersten, "Robust cognitive beamforming with bounded channel uncertainties," IEEE Trans. on Signal Processing, vol. 57(12), pp. 4871-4881, Dec. 2009.
H. Du et al., "Joint transceiver beamforming in MIMO cognitive radio network via second-order cone programming," IEEE Trans. on Signal Processing, vol.60(2), pp. 781-792, Feb. 2012.
K.T. Phan et al., "Spectrum sharing in wireless networks via QoS-aware secondary multicast beamforming," IEEE Trans. on Signal Processing, vol. 57(6), pp. 2323-2335, Jun. 2009.
Y. Huang et al., "Robust multicast beamforming for spectrum sharing-based cognitive radios," IEEE Trans. on Signal Processing, vol. 60(1), pp. 527-533, Jan. 2012.
A. Pascual-Iserte et al., "A robust maximin approach for MIMO communications with imperfect channel state information based on convex optimization," IEEE Trans. on Signal Processing, vol. 54(1), pp. 346-360, Jan. 2006.
X. Ma and G. B. Giannakis, "Maximum-diversity transmissions over doubly selective wireless channels," IEEE Trans. on Information Theory, vol. 49(7), pp. 1832-1840, Jul. 2003.
T. Zemen and C.F. Mecklenbrauker, "Time-variant channel estimation using discrete prolate spheroidal sequences," IEEE Trans. on Signal Processing, vol. 53(9), pp. 3597-3607, Sep. 2005.
D. Slepian, "Prolate spheroidal wave functions, Fourier analysis, and uncertainty—V: The discrete case," Bell System Technical Journal, vol. 57(5), pp. 1371-1430, May-Jun. 1978.
C.-Y. Chang and C.C. Fung, "Robust interference channel transmission using sparsity enhanced mismatch models", Proc. of the IEEE Statistical Signal Processing Workshop, Ann Arbor, Michigan, USA, 2012.
C.-Y. Chang and C.C. Fung, "Sparsity enhanced mismatch model for robust spatial intercell interference cancellation in heterogeneous networks", submitted to IEEE Trans. on Communications.
R. Carrasco-Alvarez et al., "Time-varying channel estimation using two-dimensional channel orthogonalization and superimposed training," IEEE Trans. on Signal Processing, vol. 60(8), pp. 4439-4443, Aug. 2012.
A.M. Sayeed and B. Aazhang, "Joint multipath-Doppler diversity in mobile wireless communications," IEEE Trans. on Communications, vol. 47(1), pp. 123-132, Jan. 1999.
A.M. Sayeed, "Deconstructing multiantenna fading channel," IEEE Trans. on Signal Processing, vol. 50(10), pp. 2563-2579, Oct. 2002.
V. Kontorovich et al., "MIMO channel orthogonalisations applying universal eigenbasis," IET Signal Processing, vol. 2 (2), pp. 87-96, 2008.

* cited by examiner

SPARSITY ENHANCED MISMATCH MODEL FOR HETEROGENEOUS NETWORKS WITH DOUBLY-SELECTIVE FADING CHANNELS

PRIORITY CLAIM

This application claims priority to U.S. Provisional Patent Application No. 61/992,100, filed on May 12, 2014, entitled "SPARSITY ENHANCED MISMATCH MODEL FOR HETEROGENEOUS NETWORKS WITH DOUBLY-SELECTIVE FADING CHANNELS." The entirety of the aforementioned application is incorporated by reference herein.

TECHNICAL FIELD

This disclosure relates to a sparsity enhanced mismatch model for heterogeneous networks with doubly-selective fading channels.

BACKGROUND

Transmission over a doubly-fading interference channel often relies on the use of a robust precoder due to a lack of accurate channel state information, with performance often depending on a conservativeness of the mismatch model. Previously proposed mismatch models either have been deemed too conservative (deterministic models) or are prone to error due to inaccuracy in the probability density function and corresponding parameters (stochastic models).

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

In an example embodiment, a method comprises precoding, by a transmitting device comprising a processor, information for transmission on a channel to a receiving device to decrease interference of the transmission with other transmissions of other information by other transmitting devices on other channels within an interference range of the transmitting device. The precoding comprises transforming the other channels from a first subspace to a second subspace comprising determining a linear permutation matrix that increases an orthogonality of the transmission of the channel and the other transmission of the other channels. The method can further comprise determining a power allocation matrix that increases a signal to noise ratio of the transmission when received by the receiving device, wherein the determining comprises determining the power allocation matrix that causes the interference of the transmission with the other transmissions of the other information to satisfy a defined criterion.

In another example embodiment, a system comprises a memory that stores executable instructions and a processor, coupled to the memory, that facilitates execution of the executable instructions to perform operations. The operations can comprise precoding information for transmission on a channel to a receiving device to decrease interference of the transmission with other transmissions of other information by other transmitting devices on other channels within an interference range of the transmitting device. The precoding can comprise transforming the other channels from a first subspace to a second subspace comprising determining a linear permutation matrix that increases an orthogonality of the transmission of the channel and the other transmission of the other channels and determining a power allocation matrix that increases a signal to noise ratio of the transmission when received by the receiving device, wherein the determining comprises determining the power allocation matrix that causes the interference of the transmission with the other transmissions of the other information to satisfy a defined criterion.

In another example embodiment, a method, comprises decoding, by a receiving device comprising a processor, precoded information, from a transmission on a channel formed between the receiving device and a transmitting device, that has been precoded to decrease interference of the transmission with other transmissions of other information by other transmitting devices on interfering channels. The precoded information can comprise information that was transformed from the other channels from a first subspace to a second subspace based on a determination of a linear permutation matrix that increases an orthogonality of the transmission of the channel and the other transmission of the other channels. Further, the precoded information is decoded based on a power allocation matrix having been applied to increase a signal to noise ratio of the transmission for reception by the receiving device. Also, the power allocation matrix can be configured to constrain the interference of the transmission with the other transmissions of the other information to satisfy a defined criterion.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

DETAILED DESCRIPTION

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
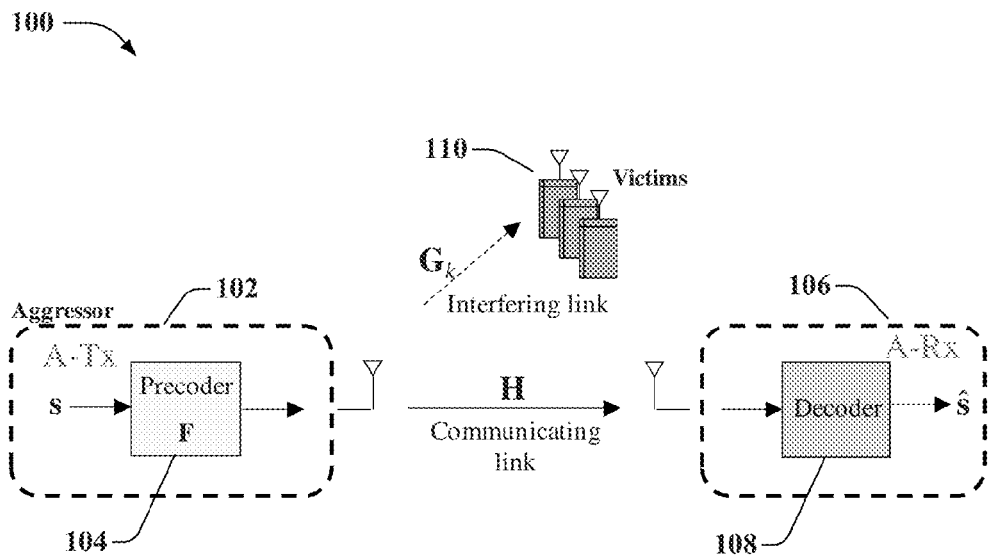
FIG. 1 illustrates a prior art schematic wireless network environment.

Intercell interference cancellation has been used to decrease the interference and increase the signal to noise ratio of received signals at a receiver. Intercell interference cancellation can result in an increase in system capacity by allowing concurrent transmissions. This is illustrated in prior art wireless schematic 100 shown in FIG. 1 when a transmitter 102, called aggressor-transmitter (A-Tx) hereafter, is transmitting to its corresponding receiver 106, called aggressor-receiver (A-Rx), in the presence of other terminals 110 which are susceptible to the transmission from A-Tx. These terminals can be referred hereafter as victims. Note that terminals in the aggressor's 102 and victim's 110 network can be located in either the macrocell or small cell, and can be either users or basestations. However, perfect interference cancellation relies on accurate channel state information, which is difficult to obtain when these cells do not cooperate. Even with backhaul to support channel information exchange among cells, channel state information (CSI) may still suffer from channel estimation error, quantization error, and may become obsolete if the channel is time-varying. Sometimes the aggressor can include a precoder 104 that performs precoding using conventional norm ball mismatch model (NBMM). The decoder 108 at receiver 106 can decode the NBMM precoded transmission, but unfortunately the error bound, i.e. radius of the norm ball, that is assumed to bound the energy of the mismatch is often chosen arbitrarily, thus affecting optimality of the design.

Due to these flaws in the prior art, disclosed herein is a model that exploits the inherent sparse characteristics of doubly-fading interference channels which leads to a two stage robust transceiver design that outperforms precoding only strategy incorporating NBMM. The inherent sparsity in the channel is brought forth by modeling the channel using a basis expansion model (BEM) where discrete prolate spheroidal sequence (DPSS) is used as a basis. The sparsity enhanced mismatch model reverse (SEMMR) discrete prolate spheroidal sequence disclosed herein better accounts for the channel state information (CSI) estimate mismatch compared to the NBMM. The SEMMR based transceiver system, which includes a two-stage precoder and decoder, allows the transceiver to utilize higher transmit power without violating the interference constraint placed at the victims, resulting in enhanced performance in the communication link. This is achievable because the additional transmit power have been "absorbed", or allocated, to the sparse elements, also known as the non-principal components (NPCs) in the interfering channel, made possible by judiciously choosing a BEM to represent the channel.

In an embodiment, the SEMMR based two stage transceiver system avoids an issue where the principle components (PCs) of the communicating and interfering channels are naturally aligned which hinders performance. Therefore, the SEMMR based system reverses the order of the DPS coefficients of all the interfering channels, thus maximizing the orthogonality between DPS coefficients of the communicating and interfering channel in subspace, spanned by the DPS basis. A large amount of transmit power can consequently be allocated to the PCs of the communicating channel, which coincide with the NPCs of the interfering channels, drastically enhancing the receive SNR at the A-Rx without causing additional interference toward the victims. This is brought about by the existence of dual parameters in the SEMMR which allows it to have fine-grained control of the mismatch energy bound. It is proven that the maximum amount of sparsity that can be exploited for transceiver design with doubly-fading channel to attain higher performance compared to the use of the NBMM equals MN−1, where M and N denote the number of subcarriers (it is assumed OFDM is used) and temporal blocks, respectively, at the A-Tx.

Figure 2:
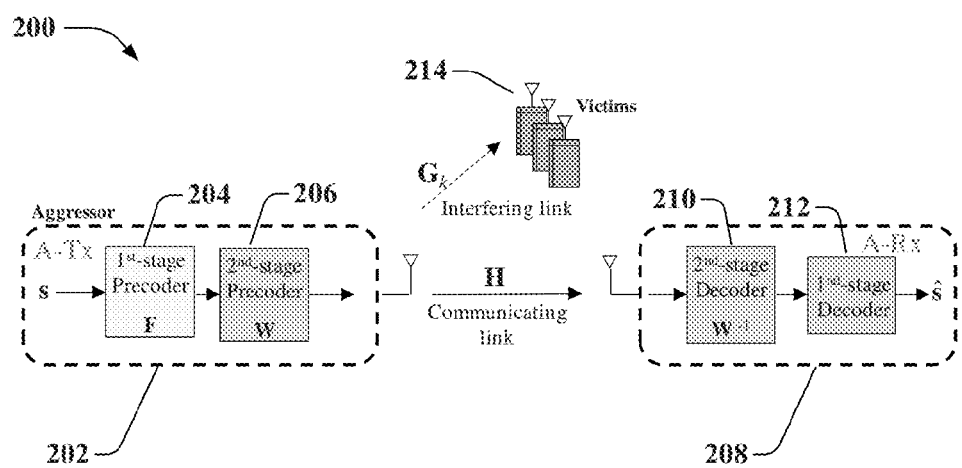
FIG. 2 illustrates a schematic wireless network environment that can operate in accordance with various aspects and embodiments described herein.

Turning now to FIG. 2, illustrated is a schematic wireless network environment 200 that can operate in accordance with various aspects and embodiments described herein.

Wireless network environment 200 includes an aggressor transmitter A-Tx 202 that sends a transmission to an aggressor receiver A-Rx 208, meanwhile victim terminals 214 are on an interfering link. A first and second stage precoder 204 and 206 are used to precode the transmission to increase performance by reversing the order of the DPS coefficients of all the interfering channels, thus maximizing the orthogonality between the DPS coefficients of the communicating and interfering channel in subspace, spanned by the DPS basis. A large amount of transmit power can consequently be allocated to the PCs of the communicating channel, which coincide with the NPCs of the interfering channels, drastically enhancing the receive signal to noise ratio at the A-Rx 208 without causing additional interference toward the victims 214. A second and first stage decoders 210 and 212 at the A-Rx 208 can un-reverse the coefficients and decode the precoded transmission.

In an embodiment, the precoding by two stage precoders 204 and 206 can include transforming the other channels from a first subspace to a second subspace comprising determining a linear permutation matrix that increases an orthogonality of the transmission of the channel and the other transmission of the other channels and determining a power allocation matrix that increases a signal to noise ratio of the transmission when received by the receiving device, wherein the determining comprises determining the power allocation matrix that causes the interference of the transmission with the other transmissions of the other information to satisfy a defined criterion.

In an embodiment, the decoding by two stage decoders 210 and 212 can include decoding, by a receiving device 208 comprising a processor, precoded information, from a transmission on a channel formed between the receiving device 208 and a transmitting device 202, that has been precoded to decrease interference of the transmission with other transmissions of other information by other transmitting devices on interfering channels. The precoded information can include information that was transformed from the other channels from a first subspace to a second subspace based on a determination of a linear permutation matrix that increases an orthogonality of the transmission of the channel and the other transmission of the other channels. Also, the precoded information is decoded based on a power allocation matrix having been applied to increase a signal to noise ratio of the transmission for reception by the receiving device, wherein the power allocation matrix is configured to constrain the interference of the transmission with the other transmissions of the other information to satisfy a defined criterion.

In an embodiment, where all of the terminals 202, 208, and 214 contain a single antenna, the goal of the A-Tx 202 is to transmit information to A-Rx 208 without causing noticeable interference toward its victims 214. Since time- and frequency-selective fading channels are special cases of doubly-selective fading channels, the signal and system notations adopted can include all three scenarios. OFDM transmission can be adopted for all frequency-selective (which includes doubly-selective) fading channels for ease of decoding. Hence, the data frame (matrix) $S \in \mathbb{C}^{M \times N}$ can be used to describe data transmission across doubly selective fading channels, with M and N denoting the number of subcarriers and number of temporal blocks respectively. The data frame can be serialized with $|s|_i$ as a data sample for transmission, where $i = nM + m$ is the serial index, with $n \in \{1, \ldots, N\}$ and $m \in \{1, \ldots, M\}$. Thus, the receive signal can be written in vector form as $$y = h \circ f \circ s + n = HFs + n \quad \text{Eqn 1:}$$

Where h, f, s, and n denote the channel, precoding, data, and channel noise vector with zero mean, independent and Gaussian distributed elements, respectively. $H \triangleq \text{Diag}(h)$ and $F \triangleq \text{Diag}(f)$ defines the corresponding channel and precoder matrix. Depending on the type of channel under consideration, h (and associated precoding, data, and noise vectors) will have different sizes. Specifically h can be:

$$= \begin{cases} vec(H_d) \mathbb{C} \in \mathbb{C}^{MN}, & \text{doubly-selective,} \\ h_t \in \mathbb{C}^N, & \text{time-selective,} \\ h_f \in \mathbb{C}^M, & \text{frequency-selective,} \end{cases} \quad \text{Eqn 2}$$

Where $[H_d]_{mn}$ is the $(m,n)^{th}$ element of the (sampled) two-dimensional (2D) doubly-selective channel function $H(f,t)$, $[h_t]_n$ is the $n^{th}$ element of the (sampled) time-varying channel impulse function $h(t)$, and $[h_f]_m$ is the $m^{th}$ element of the (sampled) frequency response function $H(f)$.

Assuming $R_s = \mathbb{E}[ss^H] = I$, the receive signal power at the A-Rx 208 is $\|HF\|_F^2$. The size of I is equal to MN, N, or M, dependent on which fading channel is considered. The instantaneous interference toward the $k^{th}$ victim is $\|G_k F\|_F^2$, where $G_k$ is the interfering channel between the A-Tx 202 and the $k^{th}$ victim. An additive error model may be employed to model channel estimation error, feedback quantization error, and obsolete CSI error such that the actual communicating and interfering channel can be expressed as $H = \hat{H} + [\Delta]_H$ and $G_k = \widehat{G_k} + [\Delta]_{G,k}$, respectively where $\hat{H}$, $\widehat{G_k}$, and, $[\Delta]_{G,k}$ may be estimates of the communicating channel, the interfering channel, and estimates of the channel error in the communicating and interfering link, respectively.

In an embodiment of the disclosure, a goal is to maximize the SNR (signal to noise ratio) toward the A-Rx 208 by designing the precoders 204 and 206 at A-Tx 202 to constrain the the instantaneous interference power toward the victims under a certain threshold. Even though in this particular embodiment, the single A-Tx scenario is disclosed, in other embodiments, multiple A-Txs with one or more antennas are possible.

Figure 3:
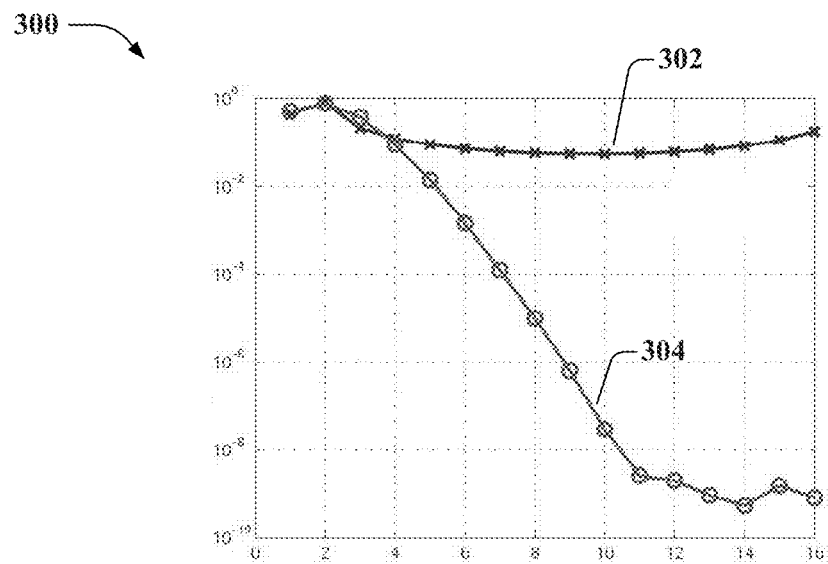
FIG. 3 illustrates a graph showing a comparison of basis expansion model coefficients on a time-selective fading channel, in accordance with various aspects and embodiments described herein.
Figure 4:
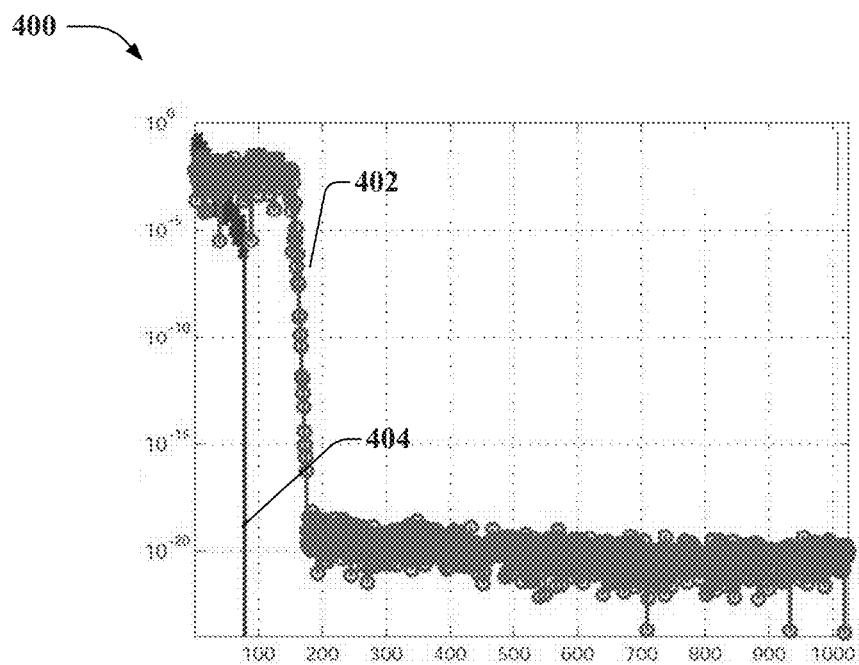
FIG. 4 illustrates a graph showing a comparison of basis expansion model coefficients on a frequency-selective fading channel, in accordance with various aspects and embodiments described herein.

Taking channel estimates into account, the robust precoder design problem may be formulated as:

$$\max \gamma \quad \text{Eqn 3}$$
$$\text{s.t.} \quad \|(\hat{H} + \Delta_H)F\|_F^2 \geq \gamma, \forall_H \in \mathcal{H}$$
$$\|(\widehat{G_k} + \Delta_{G,k})F\|_F^2 \leq I_{th}, \forall \Delta_{G,k} \in \mathcal{G}$$
$$\|F\|_F^2 \leq P_{th},$$

where $\mathcal{H};$, and $\mathcal{G}$ are mismatch models may characterize mismatch terms $\Delta_H$ and $\Delta_{G,k}$ respectively. $I_{th}$ can denotes the instantaneous interference threshold and $P_{th}$ is the transmit power threshold. Using deterministic models, $\Delta_H$ and $\Delta_{G,k}$ can be elements of:

$$\mathcal{H}_{NB} = \{\Delta_H | \|\Delta_H\|_F^2 \leq \epsilon_H\},$$
$$\mathcal{G}_{NB} = \{\Delta_{G,k} | \|\Delta_{G,k}\|_F^2 \leq \epsilon_G\}, \quad \text{Eqn 4:}$$

respectively, which are known as norm ball mismatch model (NBMM). Furthermore:

$$\max \gamma \quad \text{Eqn 5a:}$$
$$\text{s.t.} (\hat{h} + \partial_H)^H Q (\hat{h} + \partial_H) \geq \gamma, \forall \partial_H \in \mathcal{H}; \quad \text{Eqn 5b:}$$

$$(\hat{g}_k+\partial_{G,k})^H(\hat{g}_k+\partial_{G,k}) \leq I_{th}, \forall \partial_G \in \mathcal{G};$$  Eqn 5c:

$$tr(Q) \leq P_{th}.$$  Eqn 5d:

Turning now to FIG. 3, illustrated is a graph 300 showing a comparison of basis expansion model coefficients on a time-selective fading channel, in accordance with various aspects and embodiments described herein. 302 represents a comparison of the magnitude of BEM coefficients using complex exponential (CE) basis, while 304 shows the magnitude of BEM coefficients using DPS basis for a narrow-band time-selective fading channel. Similarly, FIG. 4 illustrates a graph 400 showing a comparison of basis expansion model coefficients on a frequency-selective fading channel, in accordance with various aspects and embodiments described herein. 402 represents a comparison of BEM coefficients using DPS basis, while 404 shows a complex exponential basis for a frequency selective fading channel.

Time-selective channels represented using DPSSs (304) can have higher energy compaction than CE (302) as shown in FIG. 3 by noting the amount of PCs needed to represent the channels using the DPSS is much less than that of the CE. However, for frequency-selective channels with high rms delay spread such as the case in FIG. 4, the CE basis 404 can have higher energy than the DPSS basis 402. This is because the first few DPSSs have their energy concentrated mostly in the middle part of the spectrum as shown in. However, channels with low coherence bandwidth may have low bandwidth with significant frequency components in the high frequency range, which the DPSS will fail to capture using only the first few sequences. Nevertheless, the amount of disparity between the PCs and NPCs using DPSSs is large in either scenarios, allowing for the possibility of enhanced performance by properly allocating transmit power.

In an embodiment, over a double-selective fading channel, receive signal consists of a superpositions of delay-shifted and Doppler shifted copies of the transmit signal. The channel can be expressed as:

$$h(\tau, t) = \frac{1}{\sqrt{P}} \sum_{p=1}^{P} a_p e^{j2\pi v_p t} \delta(t - \tau_p),$$  Eqn 6

Where $a_p$, $v_p$, and $\tau_p$ can be the complex amplitude, Doppler-shift, and delay-shift of the $p^{th}$ path, respectively. The Doppler shift $v_p = v_{max} \cos \theta_p$ is determined by the angle of travel (AoT), $\theta_p$, and maximum Doppler shift, $v_{max}$. The AoT is measured between the direction of motion of the terminal and the direction of arrival of the transmitted wave. $v_{max} = (f_c/c_0)v$ is in unit of Hz, where $f_c$, $c_0$, and $v$ denote the carrier frequency, speed of light, and speed of receiver relative to the transmitter, respectively. The channel is assumed to be maximally spread in delay and Doppler space such that $\tau_p \in [0, \tau_{max}]$ and $v_p \in [-v_{max}, v_{max}]$, with $\tau_{max}$ denoting the maximum delay spread. It can be assumed that the channel considered is underspread such that $\tau_{max} v_{max} \ll 1$.

Let $H(f,t)$ denote the frequency response of a time-selective fading channel, which is the Fourier transform of $h(\tau,t)$, with respect to $\tau$, i.e. $H(f,t) = \mathcal{F}_\tau \{h(\tau,t)\} = \int_\tau h(\tau,t) e^{-2\pi f \tau} d\tau$. $H(f,t)$ can be approximated by summation $L(2N_D+1)$ complex exponential (CE) functions as:

$$H(f,t) \approx \tilde{H}(f,t) = \sum_{l=0}^{L-1} \sum_{n=-N_D}^{N_D} H_c^{(F)}[l,n] e^{-j2\pi l f/W} e^{j2\pi n t/T_S},$$  Eqn 7 where $L = \lceil \tau_{max} W \rceil$ and $N_D = \lceil T_S v_{max} \rceil$, with $W = 1/T_s$ and $T_S$ denoting the transmit symbol bandwidth and duration, respectively. (Eqn 7) is the BEM of $H(f,t)$ using Fourier (complex exponential) as basis functions with $$H_c^{(F)}[l,n] \approx \sum_p a_p \exp[-j\pi(n - T_S v_p)]$$

$$\frac{\sin[\pi(l - W\tau_p)]\sin[\pi(n - T_S v_p)]}{\pi^2(l - W\tau_p)(n - T_S v_p)}$$

$$= \sum_p a_p \exp[-j\pi(n - T_S v_p)]$$

$$\text{sinc}(l - W\tau_p, n - T_S v_p)$$

denoting the corresponding coefficient and $$\text{sinc}(x, y) \triangleq \frac{\sin(\pi x)\sin(\pi y)}{\pi^2 xy}.$$

According to (Eqn 7), H(f,t) has dimension:

$$D = L(2N_D + 1) \approx \tau_{max} v_{max} W T_S.$$  Eqn 8:

The approximation in (Eqn 7) is due to the discarding of sidelobes of the sinc kernel induced by the finite signaling parameters, with increasing accuracy as W and $T_S$ go up. Discrete prolate spheroidal sequences may substitute to bypass such leakage problem. DPS sequences have been proven to provide maximal concentration in the time domain for bandlimited signals (and vice versa) and also serve as basis functions using minimum number of coefficients without the deficiencies of the Fourier basis.

DPSS can be the best suboptimal basis for representing doubly-selective fading wide-sense stationary uncorrelated scattering channels in the mean-squared sense, assuming the channel is τ- and v-limited, implying that the delay-Doppler spreading function $S(\tau,v) \triangleq \mathcal{F}_\tau \{h(\tau,t)\} = 0$ for $(\tau,v) \notin [0, \tau_{max}] \times [-v_{max}, v_{max}]$. To be more specific, assuming OFDM signaling is used hereafter. Consider a resource block containing N OFDM symbols with M subcarriers. Channel matrix $H_d \mathbb{C} \in \mathbb{C}^{M \times N}$ consists of channel at each subcarrier for each OFDM symbol, and $$[H_d]_{mn} = H(f,t)|_{f=m\Delta_f, t=nT_S},$$

where $T_S$ can be symbol interval with cyclic prefix (CP), i.e. $T_S = T_{CP} + T_s$, with $T_{CP}$ and $T_s$ denoting the duration of the CP and useful OFDM symbol, respectively.

$$\Delta_f \triangleq \frac{1}{T_s}$$

can be the subcarrier spacing. Letting $\Phi_f \in \mathbb{C}^{M \times M}$ and $\Phi_t \in \mathbb{C}^{N \times N}$ denoting two orthogonal DPS basis matrices with column vectors $\{\zeta\phi_\ell^{(f)}\}$ and $\{\phi_q^{(t)}\}$, respectively, the channel matrix $H_d$ can be represented by the biorthogonal transform $$H_d = \Phi_f H_{c,d} \Phi_t^T \in \mathbb{C}^{M \times N},$$  Eqn 9:

where $H_{c,d}$ is the DPS coefficient matrix. (Eqn 9) can be interpreted as a 2D DPS-BEM. Column vectors of $\Phi_f$ and $\Phi_t$ are obtained by finding the eigenbasis of real-valued symmetric kernel matrices, i.e. $C_\tau \phi_\ell^{(f)} = \lambda_\ell^{(\tau)} \phi_\ell^{(f)}$ and $C_v \phi_q^{(t)} = \lambda_q^{(v)} \phi_q^{(t)}$. The elements of the kernel matrices can be expressed as $$[C_\tau]_{m,m'} = \frac{\sin(2\pi(m'-m)\tilde{\tau}_{max})}{\pi(m'-m)}, \text{ and } [C_v]_{n,n'} = \frac{\sin(2\pi(n'-n)\tilde{v}_{max})}{\pi(n'-n)},$$

with $m,m' \in \{1, \ldots, M\}$ and $n,n' \in \{1, \ldots, N\}$, where $\tilde{\tau}_{max} = \tau_{max}/T_s$ and $\tilde{v}_{max} = v_{max}T_s$ are normalized maximum delay and Doppler spread, respectively. The energy of channel $H_d$ can be mostly concentrated on the coefficients $[H_{c,d}]_{l,m}$ with $1 \le \ell \le L_{min}$ and $1 \le q \le Q_{min}$, where $\lceil 2\tilde{\tau}_{max}M \rceil + 1 \le L_{min} \le M$ and $\lceil 2\tilde{v}_{max}N \rceil + 1 \le Q_{min} \le N$. The reason behind the concentration is because the magnitude of the eigenvalues $\lambda_l^{(\tau)}$ and $\lambda_q^{(v)}$ may drop rapidly when $\ell > 2\tilde{\tau}_{max}M$ and $q > 2\tilde{v}_{max}N$, respectively. For time- and frequency-selective only channels, one-dimensional (1D) DPS-BEM can be written as $$h_t = \Phi_t h_{c,t} \in \mathbb{C}^N \qquad \text{Eqn 10:}$$

and $$h_f = \Phi_f h_{c,f} \in \mathbb{C}^M, \qquad \text{Eqn 11:}$$

Where $[h_t]_n = h(t)|_{t=nT_s}$ and $[h_f]_m = H(f)|_{f=m\Delta f}$ are the $n^{th}$ element of $h_t$ which corresponds to the $n^{th}$ sample of $h(nT_s)$, and the $m^{th}$ element of $h_f$ which corresponds to the $M^{th}$ sample of $H(m\Delta f)$, respectively. $h(t)$ and $H(f)$ denote time- and frequency-selective fading channels, respectively. $h_{c,t}$ and $h_{c,f}$ are the corresponding DPS coefficient vectors.

In an embodiment, a higher receive SNR at the A-Rx 208 can be achieved using the structural mismatch model (SMM) and sparsity enhanced mismatch model (SEMM) by exploiting the sparse elements induced by the SMM and SEMM. In the latter, the inherent sparse elements, or near-sparse elements, in $G_k$ can be extracted and exploited for mismatch modeling in the precoder design process, which can allow for higher receive power at the A-Rx 208 compared to the use of the NBMM. In the SEMM, the angular domain representation (ADR) and eigenmode basis were utilized to model MIMO channels, but the former can be susceptible to correlation between H and $G_k$ and the latter is channel dependent. In addition, they both can offer substantial energy compaction capability albeit under ideal circumstances. Hence, a good basis expansion model requires the basis vectors to be invariant to channel response, does not suffer from the same strong correlation problem experienced by the ADR, and has good energy compaction, even under non-ideal circumstances. The correlation is an indication of how closely the coefficients of H and $G_k$ are located in subspace. For instance, using the ADR, the correlation is defined as $r_{H,G_k,a} \triangleq \text{tr}(|G_{a,k}|^T|H_a|)$ where $|A|$ denotes the elementwise magnitude value of A. $G_{a,k} = W_V^H G_k W_T$ and $H_a = W_V^H H W_T$, where $W_V$ and $W_T$ are unitary Discrete Fourier transform matrices that denote the angular domain coefficient matrix of $G_k$ and H respectively. Even though the DPSS is an ideal candidate to model doubly-selective fading channels as it possesses most of the above qualities of being a good basis, it still suffers from strong correlation. Similar to the SEMM, the mismatch model proposed herein is constructed by a dual parameter concentric norm ball so that the mismatch energy corresponding to the PCs and NPCs can be judiciously bounded.

Applying equations 10 and 11 to the time or frequency selective interfering channel matrix $G_k$, it can be vectorized as $g_{k,t} = \Phi_t g_{c,k,t} \in \mathbb{C}^N$ and $g_{k,f} = \Phi_f g_{c,k,f} \in \mathbb{C}^M$, respectively. Using equation 9, the doubly selective fading interfering channel matrix $G_{k,d}$ can be expressed as $G_{k,d} = \Phi_f G_{c,k,d} \Phi_t^T \in \mathbb{C}^{M \times N}$ and vectorizing becomes:

$$g_{k,d} \triangleq \text{vec}(G_{k,d}) = (\Phi_t \otimes \Phi_f)\text{vec}(G_{c,k,d}) \qquad \text{Eqn 12}$$

$$= (\Phi_t \otimes \Phi_f)g_{c,k,d} \in \mathbb{C}^{MN}.$$

In summary, the bases and their associated coefficient vectors for various selective fading channels can then be denoted as:

$$(\Phi, g_{c,k}) = \begin{cases} (\Phi_t \otimes \Phi_f, g_{c,k,d}), & \text{doubly-selective,} \\ (\Phi_t, g_{c,k,t}), & \text{time-selective,} \\ (\Phi_f, g_{c,k,f}), & \text{frequency-selective.} \end{cases}$$

Note that the energy of $g_k$ (which can equal $g_{k,d}$, $g_{k,t}$, or $g_{k,f}$) is mostly concentrated on a few coefficients in $g_{c,k}$, the amount of which reflects the number of PCs, which can be denoted as $n_{pc}$. Since the DPS coefficients of the channel are distributed nonuniformly, and that most of the energy are concentrated on the greatest $n_{pc}$ coefficients in the DPS domain, the energy of the mismatch can be bounded using the dual parameter concentric norm ball mismatch model called Sparsity Enhanced Mismatch Model-Reverse DPSS (SEMMR), which is defined as $$\text{SEMMR: } \mathcal{G}_{SEMMR} \triangleq \left\{ \partial_{G,c} \Big| \begin{array}{l} \|\partial_{G,c,pc}\|_2^2 \le \varepsilon_{G,c,pc}^2, \\ \|\partial_{G,c,npc}\|_2^2 \le \varepsilon_{G,c,npc}^2 \end{array} \right\} \qquad \text{Eqn 14}$$

Where $\varepsilon_{G,c,npc}^2$ and $\varepsilon_{G,c,pc}^2$ can be obtained either parametrically, or nonparametrically using statistical learning. Similar to the SEMM, the SEMMR can offer different levels of robustness between the PCs and NPCs, and thus be able to outperform the NBMM in the context of transceiver design as shown in the sequel. It is assumed throughout that a LMMSE estimator may be used to estimate $g_{c,k}$ (implying the estimation is done in the DPS domain), the SNR during the estimation period is modestly high (this can be known hereafter as estimation SNR, or ESNR), e.g. ESNR≥0 to 10 dB, and sufficiently large disparity exists between the PCs and the NPCs, then a sufficiently large disparity will also exist between the PCs and the NPCs. The "reverse" part of the model can further reduce the correlation between H and $G_k$ and will be made more apparent infra.

In an embodiment of the first stage of the SEMMR based two stage transceiver (e.g., precoder 204), extra transmit power at the A-Tx 202 can be allocated to the components of the NPCs without causing too much interference power, and assuming these NPCs do not correlate strongly with the PCs of the communicating channel, this will in turn increase the intended signal power to the A-Rx 208. Therefore, the first-stage SEMMR based precoder 204 can be designed by imposing interference constraints regarding the mismatch terms associated with the PCs and NPCs separately, instead of merging them together. Applying basis expansion on the interfering channel, the interference constraint in (3) can be expressed as:

$$(\hat{g}_k + \partial_G)^H Q(\hat{g}_k + \partial_G) = (\hat{g}_{c,k} + \partial_{G,c})^H \tilde{Q}(\hat{g}_{c,k} + \partial_{G,c}), \qquad \text{Eqn 15}$$

$$= (\hat{g}_{c,k} + \partial_{G,c,pc} + \partial_{G,c,npc})^H$$

-continued $$(\hat{g}_{c,k} + \partial_{G,c,pc} + \partial_{G,c,npc})$$
$$\leq I_{th}, \forall \partial_{G,c} \in \mathcal{G}_{SEMMR}$$

Where $\tilde{Q} \triangleq \Phi^H Q\Phi$. Since the value of the PCs are significantly larger than those of the NPCs, more emphasis can be placed on the PCs when accounting for the mismatch in the channel, hence the interference constraint can be partially replaced by $$(\tilde{g}_{c,k} + \partial_{G,c,pc})^H \tilde{Q}(\tilde{g}_{c,k} + \partial_{G,c,pc}) \leq k_{pc} I_{th}, \qquad \text{Eqn 16:}$$

The constraint on the PCs in equation 16 may however force power to be redistributed from the PCs to the NPCs, thus amplifying the effect of the estimation error of the NPCs as this estimation error has yet been accounted for in the design. This may induce excessive interference toward the victims. Hence, additional constraints may be required to subdue this adverse effect from the NPC terms. This can be seen more clearly by expanding equation 15 as:

$$(\hat{g}_{c,k} + \partial_{G,c})^H \tilde{Q}(\hat{g}_{c,k} + \partial_{G,c}) \qquad \text{Eqn 17a}$$

$$= \underbrace{(\partial_{G,c,pc} + \hat{g}_{c,k})^H \tilde{Q}(\partial_{G,c,pc} + \hat{g}_{c,k})}_{PC} \qquad \text{Eqn 17b}$$

$$+ \underbrace{\partial_{G,c,npc}^H \tilde{Q} \partial_{G,c,npc}}_{NPC-direct} + \underbrace{2\Re\left(\hat{g}_{c,k}^H \tilde{Q} \partial_{G,c,npc}\right)}_{NPC-cross} \qquad \text{Eqn 17c}$$

$$+ \underbrace{2\Re\left(\partial_{G,c,pc}^H \tilde{Q} \partial_{G,c,npc}\right)}_{coupling}, \qquad \text{Eqn 17d}$$

Where equation 17b and c reflect the contribution the NPCs have on the interference. The coupling term may represent the amount of coupling between $\partial_{G,c,pc}$ and $\partial_{G,c,npc}$. Since $\partial_{G,c,pc}$ and $\partial_{G,c,npc}$ are orthogonal, this results in small value for $\partial_{G,c,pc}^H \tilde{Q} \partial_{G,c,npc}$. However, since this is not equal to 0 exactly, it can be accounted for when bounding the PC term in (17b) as the PCs are detrimental in causing interference at the victims due to their higher coefficient value. Thus $k_{pc}$ is suggested to be 1/4 since (15) has been divided into four terms in (17).

Using the Rayleigh quotient, the NPC-direct term is upper bounded as $$\partial_{G,p,npc}^H \tilde{Q} \partial_{G,c,npc} \leq \lambda_{max}(\tilde{Q}) \mathcal{E}_{G,c,npc}^2 \leq I_{th}/3 \qquad \text{Eqn 18:}$$

Since $\lambda_{max}(\tilde{Q}) = \lambda_{max}(Q)$. The upper bond $I_{th}/3$ can be used because the original bound $I_{th}$ has now been divided into three significant interference terms embedded inside (Equation 17b) and (Equation 17c) (contribution from the coupling term has already been accounted for by the PC term in (Equation 16 by setting $k_{pc}$=1/4.). Note that the upper bound in the first inequality in (25) can be loose because $\partial_{G,c,npc}$ is unlikely to equal to the maximum eigenvector of $\tilde{Q}$, which is the eigenvector which corresponds to the maximum eigenvalue of $\tilde{Q}$. Since $\partial_{G,c,npc} \in \mathcal{G}_{SEMMR}$, hence $\|\partial_{G,c,npc}\|_2^2 < \mathcal{E}_{G,c,npc}^2$. Assuming the channel estimate $\hat{g}$ are estimated directly in the transform domain so that the total mismatch energy pertaining to the NPCs is smaller (and in some cases significantly smaller) than that of the PCs, $\mathcal{E}_{G,x,npc}^2$ will be smaller than $\mathcal{E}_{G,x,pc}^2$, hence, a less stringent upper bound for the NPC-direct term can be written as the eigen power constraint:

$$\lambda_{max}(Q) \leq p_{th} \triangleq \frac{I_{th}/3}{\mathcal{E}_{G,c,npc}^2}. \qquad \text{Eqn 19}$$

Similarly, the NPC-cross term is upper bounded by:

$$2\Re\left(\hat{g}_{c,k}^H \tilde{Q} \partial_{G,c,npc}\right) \leq 2\left|\hat{g}_{c,k}^H \tilde{Q} \partial_{G,c,npc}\right| \qquad \text{Eqn 20}$$
$$\leq 2\|\partial_{G,c,npc}\|_2 \|\tilde{Q}\hat{g}_{c,k}\|_2$$
$$\leq 2\mathcal{E}_{G,c,npc}\|\tilde{Q}\hat{g}_{c,k}\|_2 \leq I_{th}/3.$$

The first inequality is true because $\Re(z) \leq |z|, \forall z \in \mathbb{C}$. The second inequality is due to the Cauchy-Schwarz inequality. The third inequality is derived following the same motivation and approach used for deriving the upper bound for the NPC-direct term. Hence:

$$\|\tilde{Q}\hat{g}_{c,k}\|_2 \leq q_{th} \triangleq \frac{I_{th}/3}{2\mathcal{E}_{G,c,npc}} \qquad \text{Eqn 21}$$

Therefore the SEMMR based precoder 204 with multiple victims 214 is designed by solving max γ:

$$s.t. (\hat{h} + \partial_H)^H Q (\hat{h} + \partial_H) \leq \gamma, \forall \partial_H \in \mathcal{H}; \qquad \text{Eqn 22a:}$$

$$(\partial_{G,c,pc} + \tilde{g}_{c,k})^H \tilde{Q} (\partial_{G,c,pc} + \tilde{g}_{c,k}) \leq I_{th}/4, \qquad \text{Eqn 22b:}$$

$$\lambda_{max}(Q) \leq p_{th}, \|\tilde{Q}\hat{g}_{c,k}\|_2 \leq q_{th}, \forall k, \qquad \text{Eqn 22c:}$$

$$tr(Q) \leq P_{th}. \qquad \text{Eqn 22d:}$$

In an embodiment, 22a and 22b can be reformulated into a linear matrix inequality (LMI) via the S-lemma such that the LMIs can be solved efficiently. The S-lemma is stated here as it will be used to prove the power allocation theorem for the SEMMR.

Theorem 1: S-Lemma For $A_i \in \mathbb{S}_n$, and $c_i \in \mathbb{R}$, where $i \in \{0,1\}$, and $b \in \mathbb{C}^n$. Suppose Slater condition holds, i.e., $\exists \tilde{x} \in \mathbb{C}^n$ such that $\tilde{x}^H A_1 \tilde{x} + c_1 < 0$, then the following two statements are equivalent:

i). $x^H A_0 x + 2\Re(b^H x) + c_0 < 0$, $x^H A_1 x + c_1 \leq 0$, $\forall x$.

ii). $\exists \alpha \geq 0$ such that $$\begin{bmatrix} A_0 + \alpha A_1 & b \\ b^H & c_0 + \alpha c_1 \end{bmatrix} \geq 0.$$

In an embodiment, the coefficients in coefficient vectors $g_{c,k}$ and $h_c \Phi^H h$ can be strongly correlated since $r_{H,G,c} \triangleq tr(|g_{c,k}|^T |h_c|)$ can be large. is because the coefficients inside $g_{c,k}$ and $_c$ are ordered in descending order, hence, it is no longer possible to attain performance gain via allocating more power to the sparse elements in $g_{c,k}$ using only the first-stage precoder 204 because any allowable increase in power into the NPCs of $g_{c,k}$ will be coupled directly into the NPCs of h, rendering such power increase ineffective. This problem can, however, be amended by employing a second-stage precoder 206 (and corresponding decoder 210) which linearly permutes (or reverse) the DPS coefficients of $g_k$ such that the amount of correlation between h and $g_k$ can be minimized.

The $2^{nd}$ stage precoder 206 at the transmitter 202 is to reverse the ordering of DPS coefficients associated with h and $g_k$. However, to guarantee that the coefficients in $h_c$ and $g_{c,k}$ are nearly orthogonal to each other, an additional decoder, 210, is placed at the A-Rx 208, so the effect that 206 has on h will be canceled, thereby the coefficients in $h_c$ and $g_{c,k}$ will be near orthogonal in the DPS domain. For ease of description, the design process for $2^{nd}$ stage precoder 206 will be discussed in detail below for the case of time and frequency-selective fading channels, followed by a description for doubly-selective fading channels.

In an embodiment, h and $g_k$ model either time- or frequency-selective fading channels so that $g_k$ equals to either $g_{k,t}$ or $g_{k,f}$. In an embodiment, the corresponding DPS coefficients are arranged in descending order. If $w \triangleq$ diag (W), the size of which is equal to the size of h, then the effective channel vectors $h_{eff}'=h \circ w$ and $g_{eff,k}=g_k \circ w$, such that the ordering of the elements of $h_{eff,c}' \triangleq \Phi^H_{eff}'$ and $g_{eff,c,k}=\Phi^H g_{eff,k}$ becomes ascending, where $\Phi$ equals to $\Phi_t$ or $\Phi_f$. $W^{-1}=$Diag$(w^{-1})$ is applied at the A-Rx 208's second stage decoder 210 to revert the ordering of the coefficients in $h_c$ back to descending. That is, the original channel vector h can be recovered from the effective channel vector $h_{eff}'$ as $$h_{eff} \triangleq w^{-1} \circ h \cdot w \circ h,\qquad\text{Eqn 23:}$$

Where the $i^{th}$ element of $w^{-1}$ is $[w^{-1}]_i=([w]_i)^{-1}$. To determine w, denote $g_{rv,c,k}$ as the reverse-order DPS coefficient vector associated with $g_{c,k}$, i.e., $g_{rv,c,k}=P_{rv}g_{c,k}$, where:

$$P_{rv} = \begin{bmatrix} & & 1 \\ & \cdot & \\ 1 & & \end{bmatrix} \qquad\text{Eqn 24}$$

Equation 24 is the permutation matrix which reverses the ordering of the elements of $g_{c,k}$. Then, the channel vector with reverse-order DPS coefficients is written as:

$$g_{rv,k} = \Phi g_{rv,c,k} = \Phi P_{rv} g_k = \underbrace{\Phi P_{rv} \Phi^H}_{\triangleq \tilde{R}_\Phi} g_k = \tilde{R}_\Phi g_k \qquad\text{Eqn 25}$$

By equating $g_{eff,k}$ to equation 25 so that:

$$g_{eff,k}=w \circ g_k=\tilde{R}_\Phi g_k,\qquad\text{Eqn 26}$$

then the optimal choice for w is ascertained: $w^*=(\tilde{R}_\Phi g_k)$ Ø$g_k$, where Ø represents elementwise division. Unfortunately, $w^*$ will be sensitive to not only imperfect channel state information but also different $g_k$'s in the case of multiple victims. To solve these problems, note that:

$$[w^*]_i = \sum_j [\tilde{R}_\Phi]_{ij} \left( \frac{[g_k]_j}{[g_k]_i} \right), \forall k,\qquad\text{Eqn 27}$$

Where $[g_k]_i$ is the channel gain at the $i^{th}$ instant within one block duration. To desensitize the dependence of channel state information, note that the variation of $([g_k]_j/[g_k]_i)$ is within one order of magnitude. Therefore the ratio can be approximated as:

$$([g_k]_j/[g_k]_i) \approx 1, \forall i \neq j, \forall k.\qquad\text{Eqn 28:}$$

Using this approximation, the 1D channel invariant second stage precoder 206, denoted as $\bar{w}_t$ or $\bar{w}_f$, equals:

$$\bar{w}_t=\tilde{R}_{\Phi,t}1_N=\tilde{r}_t=P\Phi_t^H 1_N,$$

$$\bar{w}_f=\tilde{R}_{\Phi,f}1_M=\tilde{r}_f=P\Phi_f^H 1_M.$$

Figure 5:
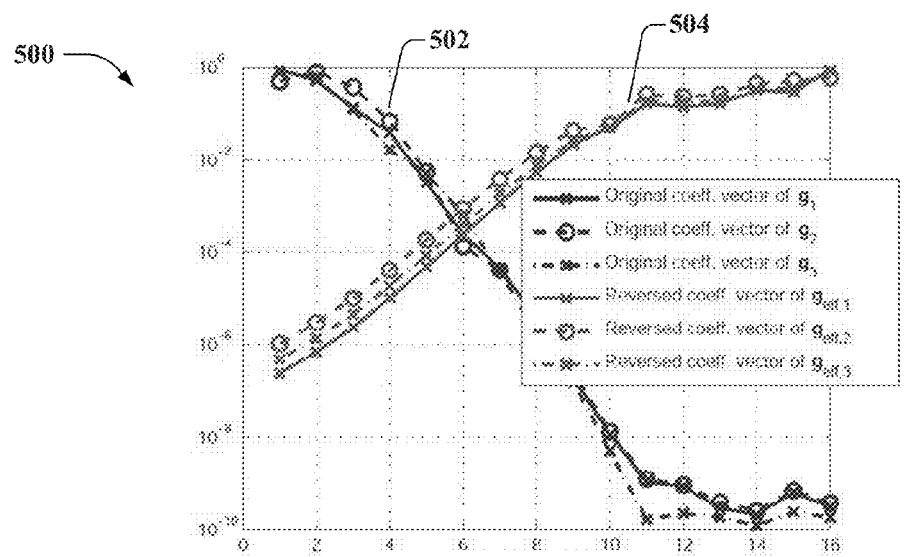
FIG. 5 illustrates a graph showing a comparison of original order and reverse order discrete prolate spheroidal coefficients on a time-selective fading channel, in accordance with various aspects and embodiments described herein.
Figure 6:
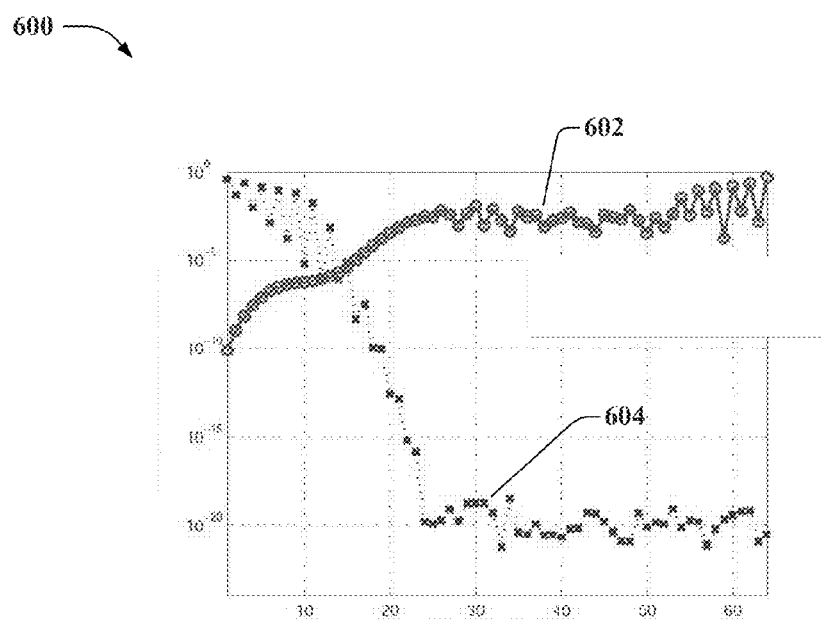
FIG. 6 illustrates a graph showing a comparison of original order and reverse order discrete prolate spheroidal coefficients on a frequency-selective fading channel, in accordance with various aspects and embodiments described herein

Applying $\bar{w}$ before transmission, the effective channel for the $k^{th}$ user becomes $g_{eff,k}=\bar{w} \circ g_k$. The approximation in equation 28 may caused a loss of accuracy in $g_{eff,k}$ compared to $g_{rv,k}$. However, this does not impair the effectiveness of $\bar{w}$ in reordering the coefficients in $g_{c,k}$. To illustrated this, FIGS. 5 and 6 show the magnitude of the DPS and reverse-order DPS coefficients of $g_k$, for time and frequency-selective fading channels, respectively, for k=1, 2, 3. The reverse-order coefficients are obtained using $\bar{w}$. Although the reverse-order coefficients in the figure do not exactly equal to the true reverse-order of $g_{c,k}$, $\bar{w}$ is still able to reverse the ordering of $g_{c,k}$.

Turning now to FIG. 5, a graph 500 showing a comparison of original order and reverse order discrete prolate spheroidal coefficients on a time-selective fading channel is shown. 502 represents a original coefficient vectors of g with k=1, 2, 3, while 504 represents reversed coefficient vectors of $g_{eff}$ at k=1, 2, 3.

FIG. 6 illustrates a graph 600 showing a comparison of original order and reverse order discrete prolate spheroidal coefficients on a frequency-selective fading channel. 604 represents a original coefficient vectors of $g_{eff}$ with k=1, 2, 3, while represents reversed coefficient vectors of $g_{eff}$ at k=1, 2, 3.

In an embodiment, in the case of a doubly selective fading channel, h and $g_k$ can model doubly-selective fading channels so that $g_k=g_{k,d}$. Note that the corresponding DPS coefficient matrix $G_{c,k}=G_{c,k,d}$ in Equation 12 has its PCs concentrated on its upper left hand corner, which is analogous to the descending order arrangement in $g_{c,k,t}$ or $c_{c,k,f}$. Since a goal of the second stage precoder 206 is to move the DPS coefficients to the lower right hand of $g_{c,k}$, hence, 206 is used to obtain the effective channel matrix:

$$G_{eff,k}=W \circ G_k,$$

Figure 7:
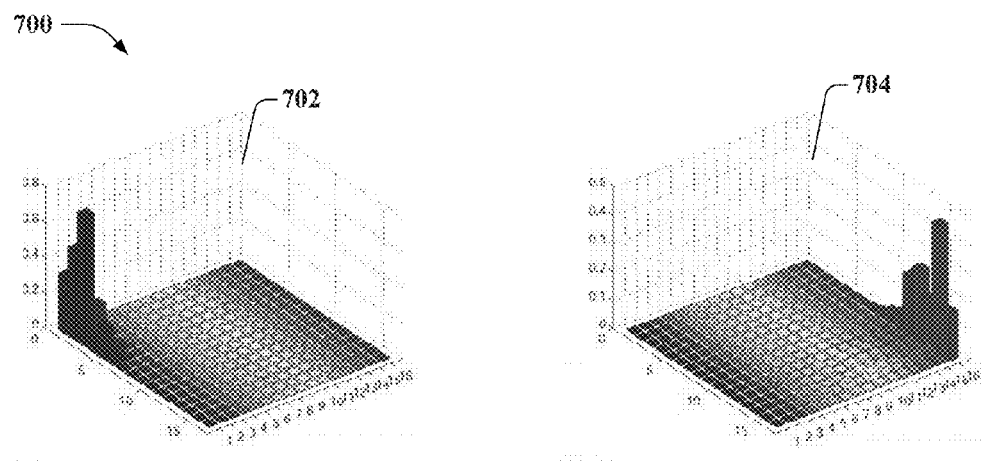
FIG. 7 illustrates graphs showing a comparison of magnitudes of discrete probate spheroidal coefficients of original and effective doubly-selective fading channels, in accordance with various aspects and embodiments described herein.

Such that it should be equal to:

$$G_{rv,k} = \Phi_f P G_{c,k} P \Phi_t^T = \underbrace{(\Phi_f P \Phi_f^H)}_{\triangleq \tilde{R}_{\Phi,f}} G_k \underbrace{(\Phi_t P \Phi_t^H)^T}_{\triangleq \tilde{R}_{\Phi,t}} \qquad\text{Eqn 29}$$
$$= \tilde{R}_{\Phi,f} G_k \tilde{R}_{\Phi,t}^T,$$

where $G_k=G_{k,d}$. Vectorizing equation 29 becomes $$g_{rv,k} = \text{vec}(G_{rv,k}) = \underbrace{(\tilde{R}_{\Phi,t} \otimes \tilde{R}_{\Phi,f})}_{\triangleq \tilde{R}_{\Phi,d}} g_k = \tilde{R}_{\Phi,d} g_k, \qquad\text{Eqn 30}$$

where $g_k \triangleq \text{vec}(G_k)$. Note that equation 30 is similar to equation 25. Therefore, applying the same argument, the resulting 2D channel invariant second-stage precoder becomes:

$$\bar{w}_d \triangleq \text{vec}(W)=(\tilde{R}_{\Phi,t} \otimes \tilde{R}_{\Phi,f})1_{MN}=\tilde{R}_{\Phi,d}1_{MN},\qquad\text{Eqn 31:}$$

and the effective channel is $g_{eff,k}=\bar{w}_d \circ g_k$. The efficacy of the 2D second-stage precoder is validated in FIG. 7 which shows the magnitude of the original doubly-selective fading channel in graph 702. Herein N=M=16, with normalized maximum Doppler shift $\tilde{v}_{max}=0.01$ and normalized maximum delay spread $\tilde{\tau}_{max}=0.1$. After $\bar{w}_d$ is applied, the magnitude of the reverse-order coefficients is shown in graph 704. [The magnitude of DPS coefficients of original doubly-selective fading channel.] [The magnitude of DPS coefficients of effective doubly-selective fading channel using 2D second-stage precoder $\overline{w}_d$.]

To summarize, the possible choices for the channel invariant second stage precoder 206 are:

$$\overline{w} = \begin{cases} \tilde{R}_{\Phi,d} 1_{MN}, & \text{doubly-selective,} \\ \tilde{R}_{\Phi,t} 1_N, & \text{time-selective,} \\ \tilde{R}_{\Phi,f} 1_M, & \text{frequency-selective.} \end{cases}$$

Finally, using the second stage precoder 206, the first stage SEMMR based precoder 204 (F) is obtained by solving:

$$\max_Q \gamma$$

s.t. $(\hat{h}+\partial_H)^H Q(\hat{h}+\partial_H) \geq \gamma, \forall \partial_H \in \mathcal{H};$  Eqn 32a:

$(\partial_{G,c,pc}+\hat{g}_{eff,c,k})^H \tilde{Q}(\partial_{G,c,pc}+\hat{g}_{eff,c,k}) \leq I_{th}/4,$  Eqn 32b:

$\lambda_{max}(Q) \leq p_{th}, \|\tilde{Q}\hat{g}_{eff,c,k}\|_2 \leq q_{th},$  Eqn 32c:

$tr(Q) \leq P_{th},$  Eqn 32d:

where $\hat{g}_{eff,c,k} = \Phi^H g_{eff,k}$ with $g_{eff,k}$ equals to either $\overline{w}_t \circ \hat{g}_{k,t}$, $\overline{w}_f \circ \hat{g}_{k,f}$ or $\overline{k}_d \circ \hat{g}_{k,d}$, and $\hat{g}_{k,x}$ being the corresponding estimate, for x=t, f, d. The problem formulation equation 32 is different from equation 22 in which it uses the effective channel vector $g_{eff,c,k}$ instead of $g_{c,k}$. The power allocation property induced by the SEMMR can be summarized by the Power Allocation exploiting Sparity Theorem-SEMMR, or PAST-SEMMR, which can be deduced from equation 32.

The Interference Constrain of the PCs $(\partial_{G,c,pc}+\hat{g}_{eff,c,k})^H \tilde{Q} (\partial_{G,c,pc}+\hat{g}_{eff,c,k})$, can be written as $$\begin{bmatrix} (i_{pc}i_{pc}^T) \circ (\tilde{Q}+\beta I_{MN}) \\ \hat{g}_{eff,c,k}^H [(1_{MN}i_{pc}^T) \circ \tilde{Q}] \\ [(i_{pc}1_{MN}^T) \circ \tilde{Q}]^H \hat{g}_{eff,c,k} \\ \hat{g}_{eff,c,k}^H \tilde{Q}\hat{g}_{eff,c,k} - \beta \varepsilon_{G,c,pc}^2 - I_{th}/4 \end{bmatrix} \succeq 0,$$

where $\beta \geq 0$ is the Lagrange multiplier. In an embodiment therefore, the amount of sparsity induced by the SEMMR that can be exploited for power allocation via proper transceiver design to enhance performance with doubly-selective fading channel equals MN−1.

In an embodiment, to simulate the result, a continuous time-varying channels can be generated as:

$$h(t) = \frac{1}{\sqrt{P}} \sum_{p=1}^{P} a_p e^{j(2\pi v_p t + \varphi_p)},$$  Eqn 33

Where $\phi_p \sim \text{Unif}[-\pi,\pi]$ denotes the random phase for path p. Equation 33 is a special case of equation 6 without considering frequency selectivity. Number of path P=20. The system is operating at center frequency $f_c$=2 GHz. Maximum speed v=100 km/hr=27.78 m/s. Number of (temporal) blocks is N=16. The AoT, $\theta_p$, is Gaussian distributed, centered at 0° with standard deviation 30°. denotes the channel vector, with elements sampled from h(t) with sampling period $T_S$=0.1 ms. The maximum normalized Doppler frequency is therefore $$\tilde{v}_{max} = \frac{27.78 \times 2 \times 10^9}{3 \times 10^8} \times (0.1 \times 10^{-3}) = 0.0185.$$

The mismatch energy bounds are $\in_H$=0.1, $\in_{G,c,pc}$=0.3, $\in_{G,c,npc}$=0.09. To make the comparison clear with the NBMM, $\in_G^2 = \in_{G,c,pc}^2 + \in_{G,c,npc}^2$.

Figure 9:
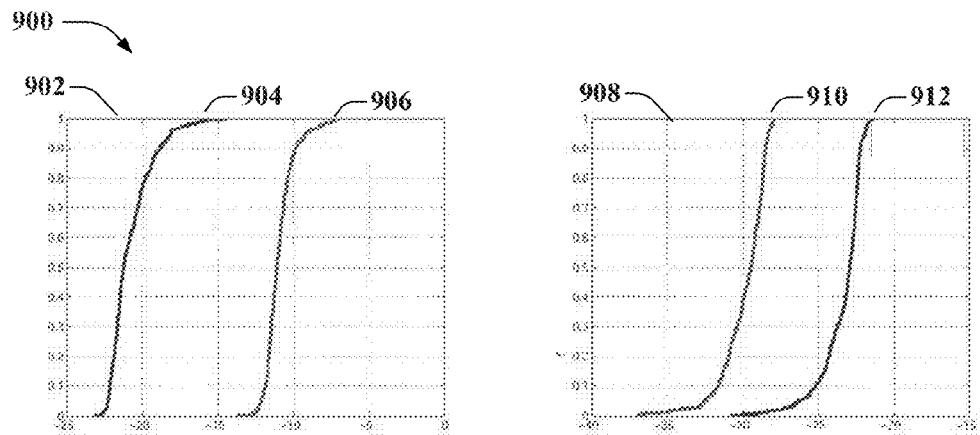
FIG. 9 illustrates graphs showing a cumulative distribution function of the receiver power at the receiver and the interference power toward the victim for time selective fading channel, in accordance with various aspects and embodiments described herein.

Turning now to FIG. 9, graphs 900 showing a cumulative distribution function of the receiver power at the receiver and the interference power toward the victim for time selective fading channel are displayed in accordance with various aspects and embodiments described herein.

As 902 shows, the receive signal power performance 906 has about 10 dB improvement using the proposed two-stage transceiver compared to the NBMM based design shown at 904. Similarly in 908 shows that the NBMM based design 912 has a corresponding increase in interference power at the victim than the SEMMR based design 910.

Figure 8:
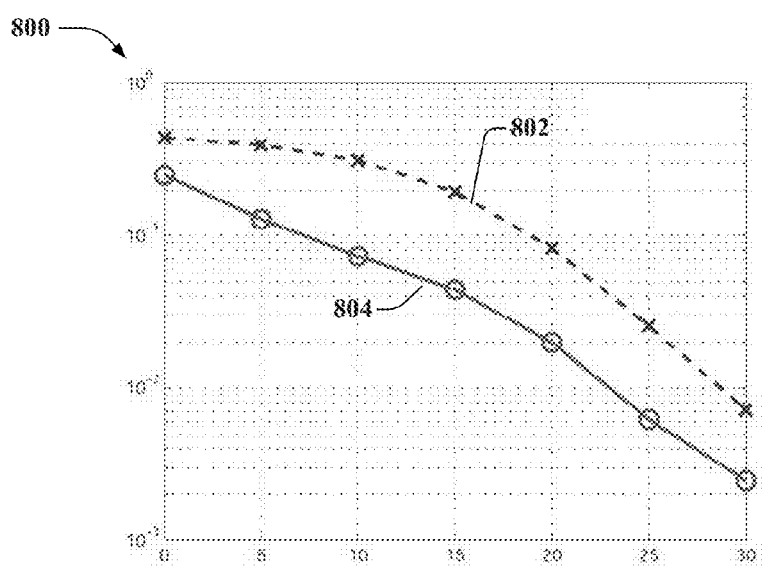
FIG. 8 illustrates a graph showing bit error rate performance for time selective fading channels with a single victim, in accordance with various aspects and embodiments described herein.

Turning to FIG. 8, illustrated is a graph 800 showing bit error rate performance for time selective fading channels with a single victim. The bit error rate for the SEMMR design 804 is significantly lower than it is for the NBMM based design 802.

Figure 10:
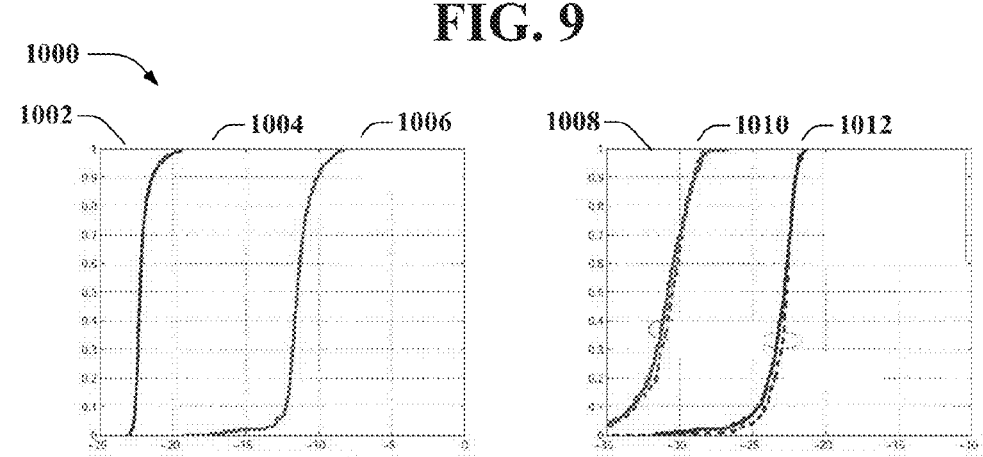
FIG. 10 illustrates graphs showing a cumulative distribution function of the receiver power at the receiver and the interference power toward the victims for time selective fading channel with three victims, in accordance with various aspects and embodiments described herein.

Likewise, in FIG. 10, which shows graphs 1000 displaying a cumulative distribution function of the receiver power at the receiver and the interference power toward the victims for time selective fading channel with three victims.

As 1002 shows, the receive signal power performance 1006 has about 10 dB improvement using the proposed two-stage transceiver compared to the NBMM based design shown at 1004. Similarly in 1008 shows that the NBMM based design 1012 has a corresponding increase in interference power at the victim than the SEMMR based design 1010.

Figure 11:
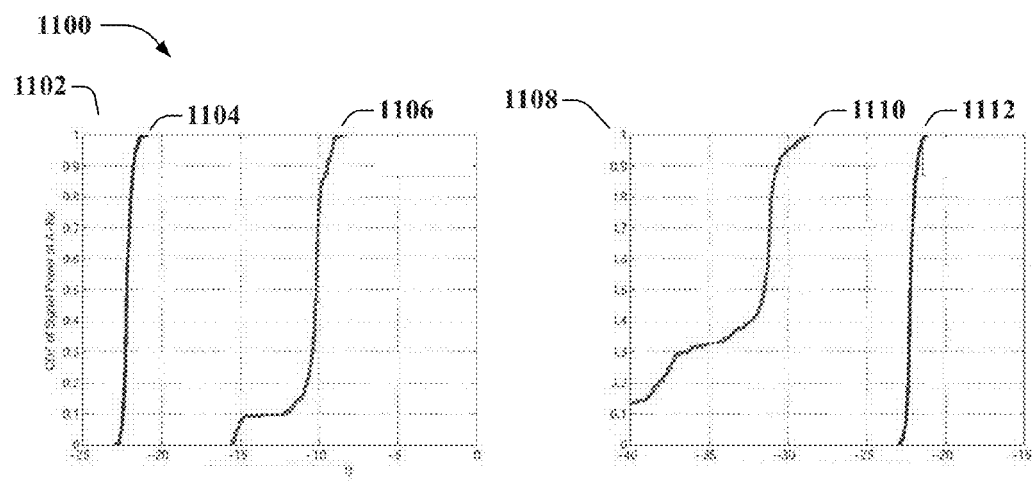
FIG. 11 illustrates graphs showing a cumulative distribution function of the receiver power at the receiver and the interference power toward the victim for a frequency selective fading channel, in accordance with various aspects and embodiments described herein.

Likewise, in FIG. 11, graphs 1100 showing a cumulative distribution function of the receiver power at the receiver and the interference power toward the victim are displayed for a frequency selective fading channel.

As 1102 shows, the receive signal power performance 1106 using the proposed two-stage transceiver is improved compared to the NBMM based design shown at 1104. Similarly in 1108 shows that the NBMM based design 1112 has a corresponding increase in interference power at the victim than the SEMMR based design 1110. Since the simulation time can be extremely prohibitive, especially when simulation parameters such as symbol duration and number of symbols increase, the FFT size is set to be M=16, with the useful OFDM symbol duration assigned to be $T_s$=3.2 µs. An exponential power delay profile (PDP) with root mean square delay spread $\sigma_{rms}$=25 ns is used to generate the channel with multipath effect. The number of principal components $n_{pc}$=3. It can be seen from the figure that the signal power performance from the SEMMR based transceiver is more than 10 dB higher than that of the NBMM based precoder, with less interference.

Figure 12:
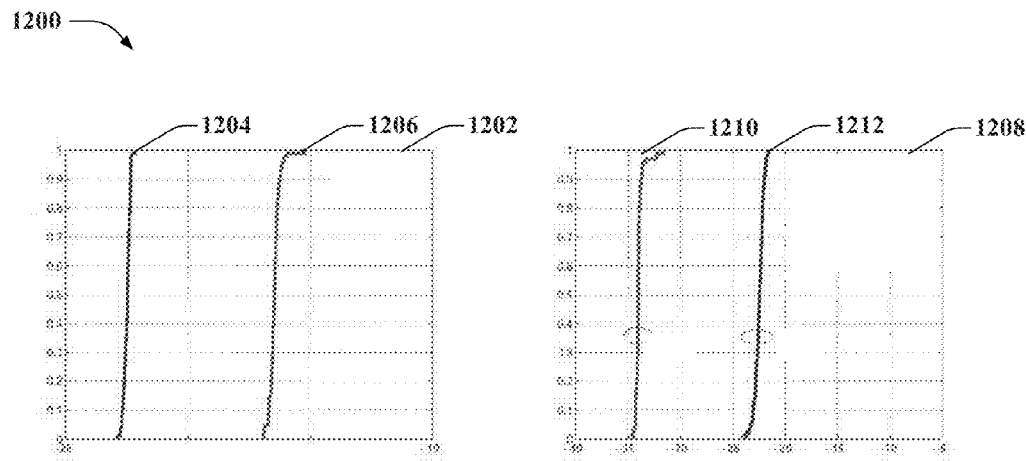
FIG. 12 illustrates graphs showing a cumulative distribution function of the receiver power at the receiver and the interference power toward the victims for a doubly-selective fading channel with three victims, in accordance with various aspects and embodiments described herein.

Similar to FIG. 11, FIG. 12 illustrates graphs 1200 showing a cumulative distribution function of the receiver power at the receiver and the interference power toward the victims for a doubly-selective fading channel with three victims. As 1202 shows, the receive signal power performance 1206 using the proposed two-stage transceiver is improved compared to the NBMM based design shown at 1204. Similarly in 1208 shows that the NBMM based design 1212 has a corresponding increase in interference power at the victim than the SEMMR based design 1210.

Figure 13:
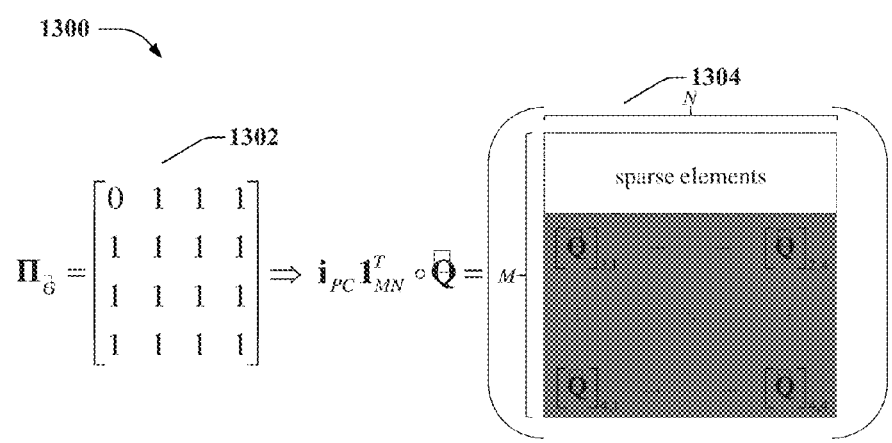
FIG. 13 illustrates an example of sparsity exploitation when power allocation is equal to N, in accordance with various aspects and embodiments described herein.

FIG. 13 illustrates an example 1300 of sparsity exploitation when power allocation is equal to N, in accordance with various aspects and embodiments described herein.

In FIG. 13, observe that only the (1,1) element of $\Pi_{\tilde{G}}$ is zero (which corresponds to an extreme case when there is only 1 NPC) which induces the first row vector of $\tilde{Q}$ to be an all-zero row. Hence these elements have more room to increase when the worst-case SNR is maximized without causing any violation in the interference constraint. To extrapolate further, when any, or all 15 elements of $\Pi_{\tilde{G}}$ equals zero (so only one coefficient in subspace is needed to represent $G_k$), this induces the corresponding row vector(s) of $\tilde{Q}$ to be zero. This will further increase the amount of transmit power that can be allocated.

Figure 14:
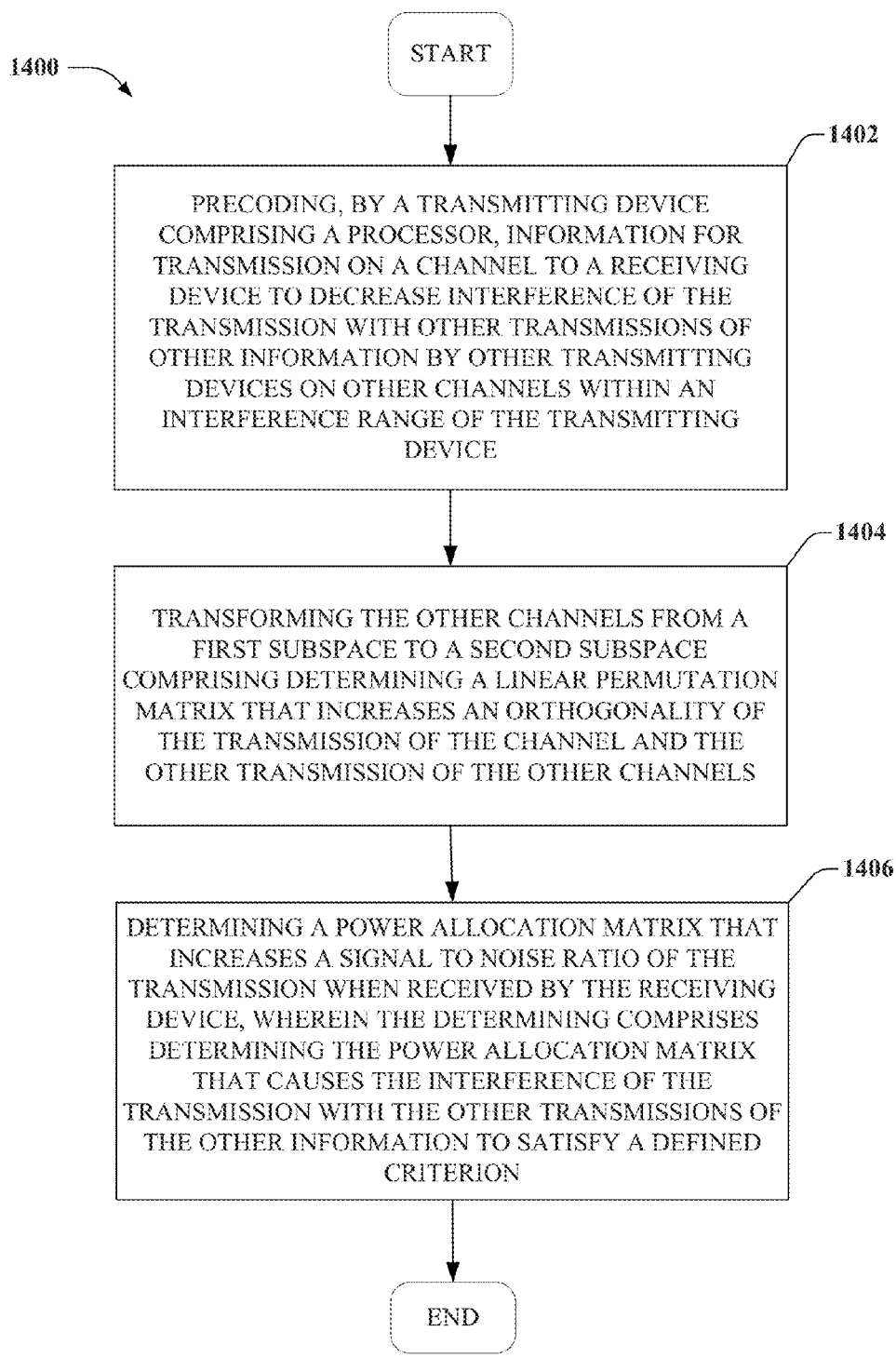
FIG. 14 illustrates a method for precoding of a transmission to decrease interference in accordance with various aspects and embodiments.

Turning now to FIG. 14, illustrated is a method 1400 for precoding of a transmission to decrease interference in accordance with various aspects and embodiments. The method can begin at 1402 where a transmitting device comprising a processor, e.g., aggressor 202, precodes information for transmission on a channel to a receiving device to decrease interference of the transmission with other transmissions of other information by other transmitting devices on other channels within an interference range of the transmitting device.

At 1404 the method can include transforming the other channels from a first subspace to a second subspace comprising determining a linear permutation matrix that increases an orthogonality of the transmission of the channel and the other transmission of the other channels (e.g., by $2^{nd}$ stage precoder 206).

At 1406, the method can include determining a power allocation matrix that increases a signal to noise ratio of the transmission when received by the receiving device, wherein the determining comprises determining the power allocation matrix that causes the interference of the transmission with the other transmissions of the other information to satisfy a defined criterion (e.g., by $1^{st}$ stage precoder 204).

Figure 15:
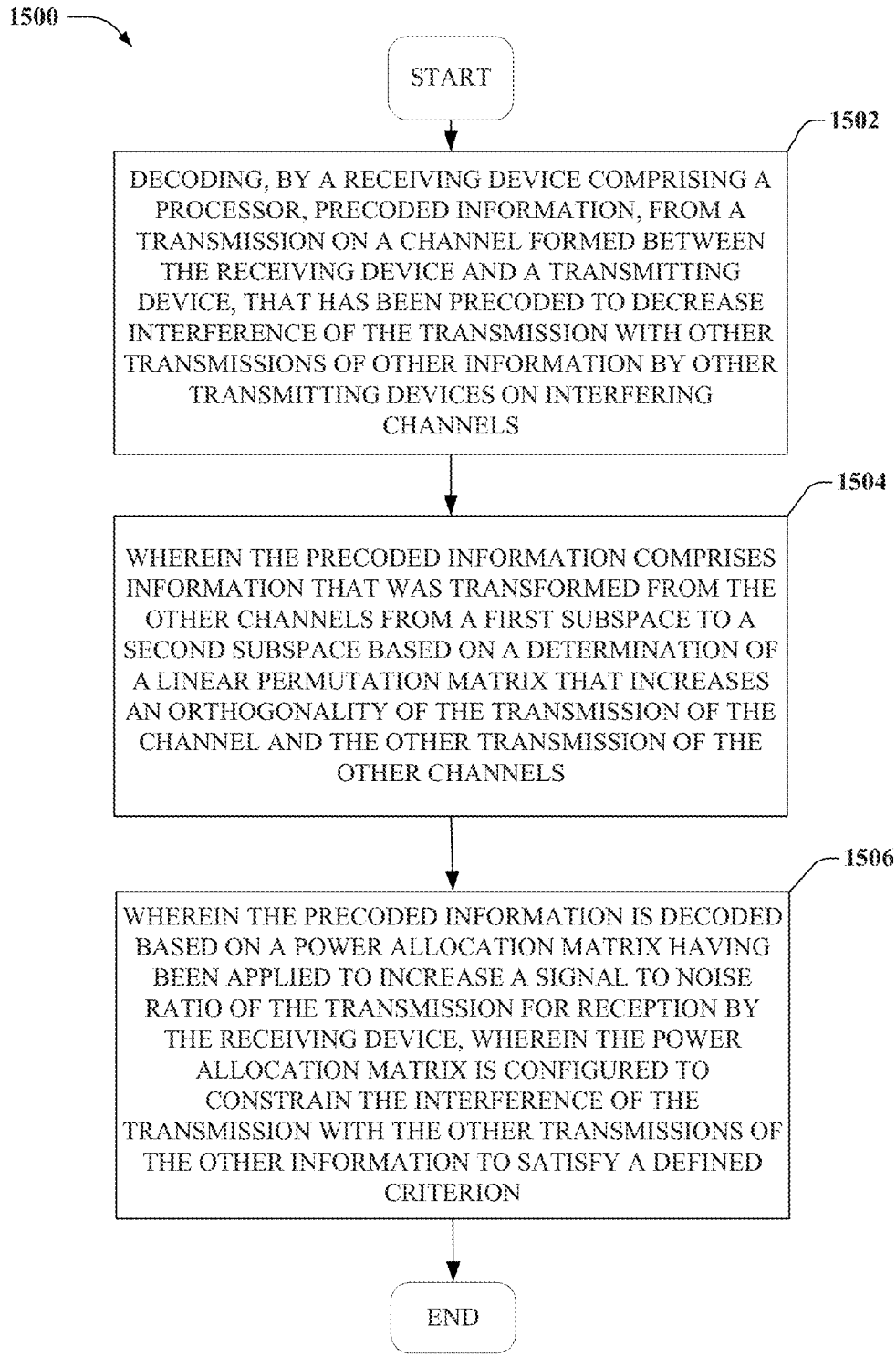
FIG. 15 illustrates a method for decoding of a transmission that has been precoded to decrease interference in accordance with various aspects and embodiments.

Turning now to FIG. 15, illustrated is a method 1500 for decoding of a transmission that has been precoded to decrease interference in accordance with various aspects and embodiments. At 1502, the method can include decoding, by a receiving device comprising a processor (e.g., receiver 208) precoded information, from a transmission on a channel formed between the receiving device and a transmitting device, that has been precoded to decrease interference of the transmission with other transmissions of other information by other transmitting devices on interfering channels.

At 1504 the method can include decoding precoded information that comprises information that was transformed from the other channels from a first subspace to a second subspace based on a determination of a linear permutation matrix that increases an orthogonality of the transmission of the channel and the other transmission of the other channels (e.g., by $2^{nd}$ stage decoder 210).

At 1506 the method can include decoding precoded information based on a power allocation matrix having been applied to increase a signal to noise ratio of the transmission for reception by the receiving device, wherein the power allocation matrix is configured to constrain the interference of the transmission with the other transmissions of the other information to satisfy a defined criterion (e.g., by $1^{st}$ stage decoder 212).

Figure 16:
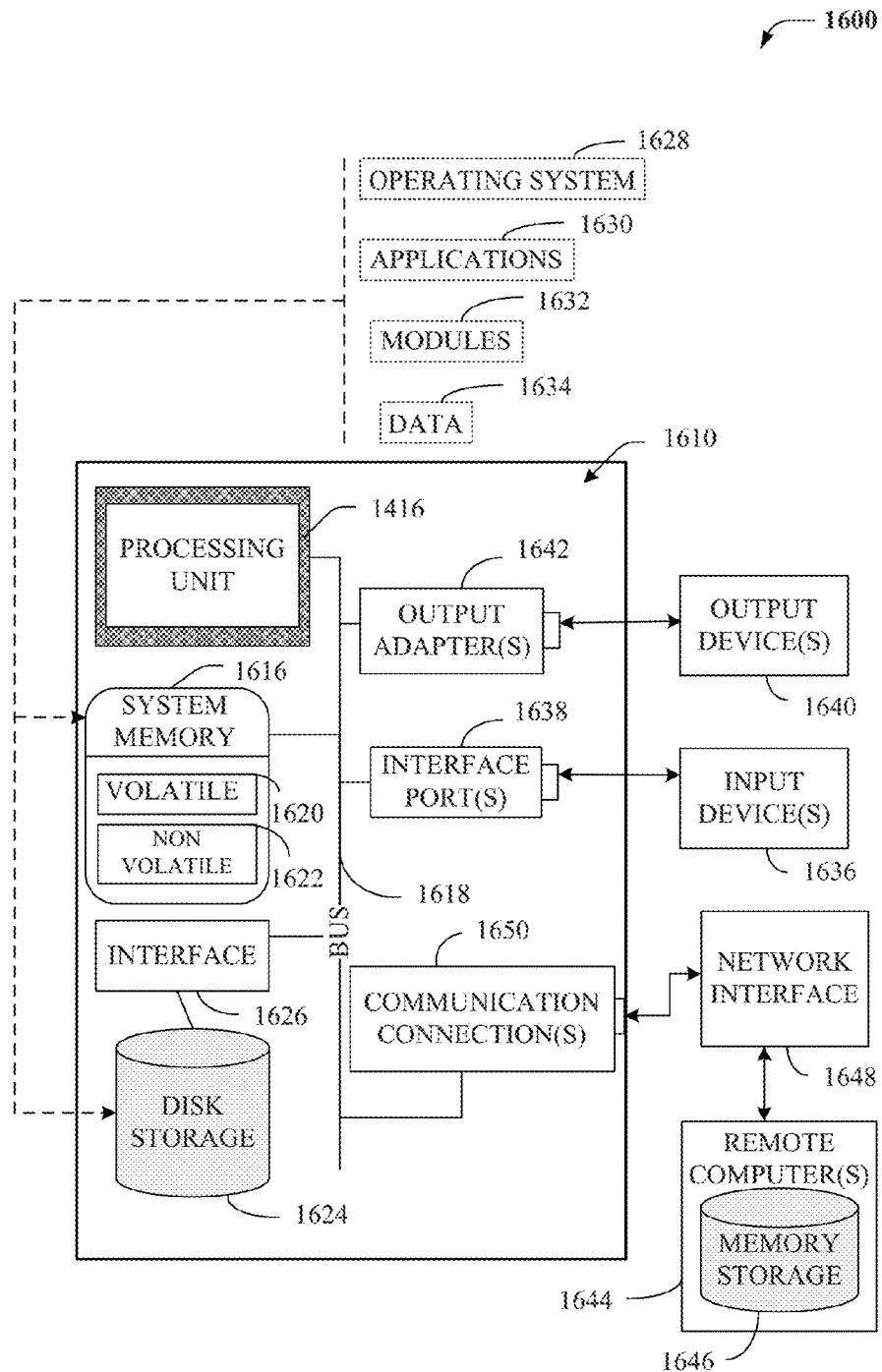
FIG. 16 is a schematic block diagram illustrating a suitable operating environment in accordance with various aspects and embodiments.
Figure 17:
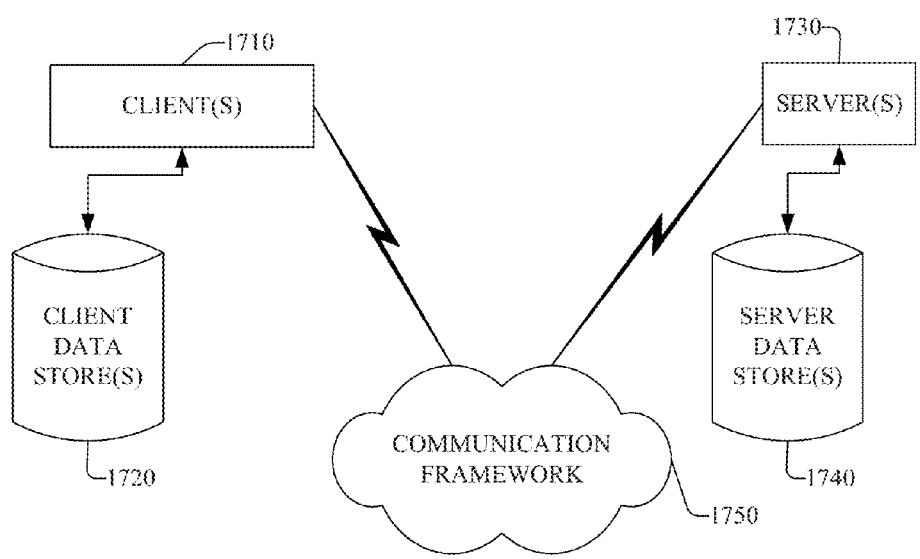
FIG. 17 is a schematic block diagram of a sample-computing environment in accordance with various aspects and embodiments.

FIGS. 16 and 17, as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

FIG. 16 illustrates a block diagram of a computing system 1600 operable to execute the disclosed systems and methods in accordance with an embodiment. Computer 1612, which can be, for example, part of the hardware of the transceiver transmitter 202 or receiver 208, includes a processing unit 1614, a system memory 1616, and a system bus 1618. System bus 1618 couples system components including, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1616 can include volatile memory 1620 and nonvolatile memory 1622. A basic input/output system, containing routines to transfer information between elements within computer 1612, such as during start-up, can be stored in nonvolatile memory 1622. By way of illustration, and not limitation, nonvolatile memory 1622 can include read only memory, programmable read only memory, electrically programmable read only memory, electrically erasable read only memory, or flash memory. Volatile memory 1620 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1612 can also include removable/non-removable, volatile/non-volatile computer storage media. FIG. 16 illustrates, for example, disk storage 1624. Disk storage 1624 includes, but is not limited to, devices like a magnetic disk drive, floppy disk drive, tape drive, flash memory card, or memory stick. In addition, disk storage 1624 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1624 to system bus 1618, a removable or non-removable interface is typically used, such as interface 1626.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 16 describes software that acts as an intermediary between users and computer resources described in suitable operating environment 1600. Such software includes an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be noted that the disclosed subject matter can be implemented with various operating systems or combinations of operating systems.

A user can enter commands or information into computer 1612 through input device(s) 1636. As an example, a user interface can be embodied in a touch sensitive display panel allowing a user to interact with computer 1612, e.g., focus state information is determined from input into a device. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1614 through system bus 1618 by way of interface port(s) 1638. Interface port(s) 1638 include, for example, a serial port, a parallel port, a game port, a universal serial bus, an infrared port, a Bluetooth port, an IP port, or a logical port associated with a wireless service, etc. Output device(s) 1640 use some of the same type of ports as input device(s) 1636.

Thus, for example, a universal serial busport can be used to provide input to computer 1612 and to output information from computer 1612 to an output device 1640. Output adapter 1642 is provided to illustrate that there are some output devices 1640 like monitors, speakers, and printers, among other output devices 1640, which use special adapters. Output adapters 1642 include, by way of illustration and not limitation, video and sound cards that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, cloud storage, cloud service, a workstation, a microprocessor based appliance, a peer device, or other common network node and the like, and typically includes many or all of the elements described relative to computer 1612.

For purposes of brevity, only a memory storage device 1646 is illustrated with remote computer(s) 1644. Remote computer(s) 1644 is logically connected to computer 1612 through a network interface 1648 and then physically connected by way of communication connection 1650. Network interface 1648 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1650 refer(s) to hardware/software employed to connect network interface 648 to bus 1618. While communication connection 1650 is shown for illustrative clarity inside computer 1612, it can also be external to computer 1612. The hardware/software for connection to network interface 1648 can include, for example, internal and external technologies such as modems, including regular telephone grade modems, cable modems and digital subscriber line modems, integrated services digital network adapters, and Ethernet cards.

FIG. 17 is a schematic block diagram of a sample-computing environment 1700 (e.g., computing system) with which the subject matter of this disclosure can interact. The system 1700 includes one or more client(s) 1710. The client(s) 1710 can be hardware and/or software (e.g., threads, processes, computing devices). The system 1700 also includes one or more server(s) 1730. Thus, system 1700 can correspond to a two-tier client server model or a multi-tier model (e.g., client, middle tier server, data server), amongst other models. The server(s) 1730 can also be hardware and/or software (e.g., threads, processes, computing devices). The servers 1730 can house threads to perform transformations by employing this disclosure, for example. One possible communication between a client 1710 and a server 1730 may be in the form of a data packet transmitted between two or more computer processes.

The system 1700 includes a communication framework 1750 that can be employed to facilitate communications between the client(s) 1710 and the server(s) 1730. The client(s) 1710 are operatively connected to one or more client data store(s) 1720 that can be employed to store information local to the client(s) 1710. Similarly, the server(s) 1730 are operatively connected to one or more server data store(s) 1740 that can be employed to store information local to the servers 1730.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as Internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions, wherein the processor can directly perform operations, and/or the processor can indirectly perform operations, for example, by directing or controlling one or more other components to perform operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or base station), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, AP, communication network, application, transition management component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    precoding, by a transmitting device comprising a processor, information for transmission on a channel to a receiving device to decrease interference of the transmission with other transmissions of other information by other transmitting devices on other channels within an interference range of the transmitting device, the precoding comprising:
        transforming the other channels from a first subspace to a second subspace comprising determining a linear permutation matrix that increases an orthogonality of the transmission of the channel and the other transmissions of the other channels; and
        determining a power allocation matrix that increases a signal to noise ratio of the transmission when received by the receiving device, wherein the determining comprises determining the power allocation matrix that causes the interference of the transmission with the other transmissions of the other information to satisfy a defined criterion, and wherein determining the linear permutation matrix comprises reversing an order of a set of discrete prelate spherical coefficients of the other transmissions on the other channels of the transmitting devices to reduce an amount of correlation between the transmission and the other transmissions.

2. The method of claim 1, wherein the determining the linear permutation matrix comprises determining the linear permutation matrix that maximizes the orthogonality.

3. The method of claim 1, wherein the reversing comprises linearly permuting the set of discrete prelate spherical coefficients.

4. The method of claim 1, wherein the precoding comprises coding the information in a time domain.

5. The method of claim 1, wherein the precoding comprises coding the information in a frequency domain.

6. The method of claim 1, wherein the defined criterion is maintaining the interference below a defined threshold value.

7. The method of claim 1, wherein the defined criterion is prevention of the interference from becoming above a defined threshold value.

8. A method, comprising:
    precoding, by a transmitting device comprising a processor, information for transmission on a channel to a receiving device to decrease interference of the transmission with other transmissions of other information by other transmitting devices on other channels within an interference range of the transmitting device, the precoding comprising:
        transforming the other channels from a first subspace to a second subspace comprising determining a linear permutation matrix that increases an orthogonality of the transmission of the channel and the other transmissions of the other channels, wherein the transforming the other channels from the first subspace to the second subspace comprises determining sparse principal component elements of the other transmissions that do not correlate to non-sparse principal component elements of the transmission according to a function that evaluates first strengths of the sparse principal component elements relative to second strengths of the non-sparse principal component elements; and
        determining a power allocation matrix that increases a signal to noise ratio of the transmission when received by the receiving device, wherein the determining comprises determining the power allocation matrix that causes the interference of the transmission with the other transmissions of the other information to satisfy a defined criterion.

9. The method of claim 8, wherein the defined criterion is maintaining the interference below a defined threshold value.

10. The method of claim 9, wherein the transforming the other channels from the first subspace to the second subspace further comprises increasing, by the transmitting device, a current allocation of power for the transmission to increase power allocated to corresponding sparse principal component elements of the transmission that correspond to the sparse principal component elements of the other transmissions.

11. A system, comprising:
    a memory that stores executable instructions; and
    a processor, coupled to the memory, that facilitates execution of the executable instructions to perform operations, comprising:
        precoding information for transmission on a channel to a receiving device to decrease interference of the transmission with other transmissions of other information by other transmitting devices on other channels within an interference range of the transmitting device, the precoding comprising:
            transforming the other channels from a first subspace to a second subspace comprising determining a linear permutation matrix that increases an orthogonality of the transmission of the channel and the other transmissions of the other channels; and determining a power allocation matrix that increases a signal to noise ratio of the transmission when received by the receiving device, wherein the determining comprises determining the power allocation matrix that causes the interference of the transmission with the other transmissions of the other information to satisfy a defined criterion, and wherein the precoding comprises weighting coefficients determined for the transmission on the channel, resulting in weighted coefficients to facilitate an improved signal to noise ratio, from the system to the receiving device, for the information of the transmission, and wherein the weighting the coefficients is based on determining elements of the transmission to shift to a sparse area of a channel of the other channels.

12. The system of claim 11, wherein the precoding comprises coding the information in a time domain.

13. The system of claim 11, wherein the precoding comprises coding the information in a frequency domain.

14. The system of claim 11, wherein the precoding comprises applying a set of coefficients in reverse order to increase the orthogonality.

15. The system of claim 11, wherein the system comprises a beam-shaping transmitting device.

16. A system, comprising:
a memory that stores executable instructions; and
a processor, coupled to the memory, that facilitates execution of the executable instructions to perform operations, comprising:
precoding information for transmission on a channel to a receiving device to decrease interference of the transmission with other transmissions of other information by other transmitting devices on other channels within an interference range of the transmitting device, the precoding comprising:
transforming the other channels from a first subspace to a second subspace comprising determining a linear permutation matrix that increases an orthogonality of the transmission of the channel and the other transmissions of the other channels; and determining a power allocation matrix that increases a signal to noise ratio of the transmission when received by the receiving device, wherein the determining comprises determining the power allocation matrix that causes the interference of the transmission with the other transmissions of the other information to satisfy a defined criterion, wherein the precoding comprises weighting coefficients determined for the transmission on the channel, resulting in weighted coefficients to facilitate an improved signal to noise ratio, from the system to the receiving device, for the information of the transmission, and wherein the coefficients are discrete prolate spheroidal information related to at least one of the other channels.

17. A method, comprising:
decoding, by a receiving device comprising a processor, precoded information, from a transmission on a channel formed between the receiving device and a transmitting device, that has been precoded to decrease interference of the transmission with other transmissions of other information by other transmitting devices on interfering channels,
wherein the precoded information comprises information that was transformed from the other channels from a first subspace to a second subspace based on a determination of a linear permutation matrix that increases an orthogonality of the transmission of the channel and the other transmissions of the other channels, wherein transformation from the first subspace to the second subspace comprises a shift of an element of the precoded information from a non-sparse area to a sparse area of a sparse matrix associated with at least one of the interfering channels, and
wherein the precoded information is decoded based on a power allocation matrix having been applied to increase a signal to noise ratio of the transmission for reception by the receiving device, wherein the power allocation matrix is configured to constrain the interference of the transmission with the other transmissions of the other information to satisfy a defined criterion.

18. The method of claim 17, wherein the sparse matrix comprises a set of coefficients associated with discrete prolate spheroidal information related to the at least one of the interferer channels.

19. The method of claim 18, wherein the linear permutation matrix effects reverse ordering of the set of coefficients.

20. The method of claim 17, wherein the precoded information was precoded according to at least one determined weighting factor to weight at least one element of a set of coefficients associated with the other transmissions of the other channels to increase the orthogonality.

21. The method of claim 17, wherein the precoding comprises coding the information in a frequency domain.

22. The method of claim 17, wherein the precoding comprises applying a set of coefficients in reverse order to increase the orthogonality.

23. The method of claim 17, wherein the transmitting device comprises a beam-shaping transmitting device.

* * * * *